United States Patent

Panter et al.

[15] 3,678,197

[45] July 18, 1972

[54] DIAL PULSE INCOMING TRUNK AND REGISTER ARRANGEMENT

[72] Inventors: Robert B. Panter; John Peter Dufton; Robert W. Duthie; George Verbaas, all of Brockville, Ontario, Canada

[73] Assignee: GTE Automatic Electric Laboratories Incorporated, Northlake, Ill.

[22] Filed: March 9, 1971

[21] Appl. No.: 122,492

[52] U.S. Cl. .......................................179/18 EB, 179/18 AH

[51] Int. Cl. .......................................H04m 7/00

[58] Field of Search.......................179/18 EB, 18 AH, 18 GS

*Primary Examiner*—Kathleen H. Claffy
*Assistant Examiner*—David L. Stewart
*Attorney*—Theodore C. Jay, Jr., K. Mullerhiem and B. E. Franz

[57] ABSTRACT

A common control telephone exchange with a central processor has a pool of dialing registers for connection to calling lines and trunks. Incoming dial pulse trunks without "stop dial" are connected to registers using the regular links and marker. To increase the time for connection, the first dial pulse is detected in the trunk and forwarded as a resistance ground on one conductor via the network. The register has a polar relay to detect this potential, which is also used for party detection or coin detection on other calls. The central processor finds the calling line class of service, and for dial pulse trunks initiates the register so that "1" is added to the first digit, and the interdigital timer is started upon operation of the polar relay, so that even if the first digit is a "1" it is registered properly.

10 Claims, 14 Drawing Figures

BY

INVENTORS
ROBERT B. PANTER
J. PETER DUFTON
ROBERT W. DUTHIE
GEORGE VERBAAS

Bernard E. Franz
ATTY.

DIAL PULSE INCOMING TRUNK AND REGISTER ARRANGEMENT

BACKGROUND OF THE INVENTION

1. Field of the Invention

This invention relates to a dial pulse incoming trunk and register arrangement, particularly for use in a communication switching system exchange of the common control type with a central processing unit.

2. Description of the Prior Art

The control of switching equipment by pulses generated at a rotary dial of a calling subset requires that pulse responsive equipment be attached to the calling circuit prior to the time the dialing operation begins in order that all pulses generated by the dial will be effective in controlling the establishment of the desired connection. This requirement presents no problem in a local originating office since the subscriber dialing operation is effectively delayed by withholding the application of dial tone until is has first been determined that the necessary dial pulse registration equipment has been attached to the calling circuit. For extended area or toll calls the call is routed to a receiving office for a tandem or terminating connection. If the originating office is of the common control type the dialed digits are registered and then automatically outpulsed to the receiving office only after the reception of a signal indicating that the pulse registration facilities are attached to the incoming circuit. If the receiving office is of the step-by-step type, the dial pulse responsive equipment comprises an inherent portion of the incoming stage, as for all other stages of such system.

The requirement that pulse responsive equipment be attached to a calling circuit prior to the generation of dial pulses presents its greatest problems when subscribers served by originating step-by-step offices are permitted access to receiving offices of the common control type. This problem arises when a substantial portion of the interdigit time interval between the routing digit dialed in the distant exchange and the first digit to be received in the called exchange, is consumed by the distant exchange in hunting for, and connecting to, an idle one of the desired trunk lines. When a large number of trunks must be searched, insufficient time remains for the incoming trunk circuit of the called exchange to connect to digit-registering apparatus before the first impulses are occur There are many solutions to this problem known in the prior art, one common practice is to use fast-acting bylinks (bypath matrix) to interconnect the incoming dial pulse trunk with suitable pulse registration equipment or, alternatively, to apply a dial tone to the connection at the receiving office only after the required pulse registration facilities are attached. Neither expedient is ideal. The use of bylinks is disadvantageous since these links are far more expensive than links of conventional speed. Further, even when bylinks are utilized, instances still coour in which digits are lost due to rapid dialing by a subscriber. Other known arrangements employ a bypath matrix which substantially reduces the connecting time of the incoming dial pulse repeaters and digit registering apparatus so that the first impulses of the first digit may be received in the called exchange almost simultaneously with the seizure of the trunk repeater. These arrangements, however, have the disadvantage that considerable additional switching equipment is required in the called exchange to provide this reduced-digit-register and trunk connecting time.

The prior art presenting other solutions include U.S. Pat. Nos. 1,504,258; 2,926,218; 3,381,094; and 3,505,480. In some of these the incoming dial pulse trunk circuit includes a counter for registering a complete digit, which is transmitted subsequently to the register equipment. Hacket et al., U.S. Pat. No. 3,381,094, provides a counter in the trunk circuit for registering two pulses, and applies special potentials to one of the conductors through the switching matrix to the register to indicate whether it has counted 0, 1, or 2 pulses, and if more than two pulses comprise the digit, it is received by a counter in the register apparatus and the count of two is added to the result for transmission to the central processor. However, in this arrangement as well as other prior art special incoming dial pulse registers are required and a special link or switching matrix is provided.

An object of this invention is to provide an incoming dial pulse trunk and register arrangement which substantially reduces the expense for providing apparatus for handling of incoming dial pulse calls, while providing a high grade of service with respect to the number of calls which are lost because register equipment is not attached in time.

SUMMARY OF THE INVENTION

According to the invention incoming dial pulse trunk circuits are provided with pulse detectors for detecting the first pulse of the first digit received, and applies a potential to one of the conductors extending via the switching matrix to the register circuit; and the register circuit includes a special device which detects this given potential. There are different types of line and trunk circuits other than the incoming dial pulse trunk circuits which may be connected to the same dial pulse registers; and the operation of the special device has a significance which depends on the type of the calling line or trunk circuit. The central processor determines the type of calling line or trunk circuit and transmits this information as part of instruction data supplied to the register. If the type designation indicates an incoming dial pulse trunk, then this fact in combination with the operation of special device is used to add a count of one to the value of the first digit as registered in a dial pulse counter.

In a specific embodiment of the invention the calling line and trunk circuits include local subscriber lines which may be party lines, and pay station lines as distinct types. Two-party lines are equipped to supply the given potential to one the conductors to indicate coin deposit. The special device in the register circuit is a polar relay connected to the two transmission conductors at the switching network in series with the pulse repeating relay.

CROSS-REFERENCES TO RELATED APPLICATIONS

This invention is related to Small Exchange Stored Programs Switching System by R. W. Duthie and R. M. Thomas disclosed in U.S. Pat. No. 3,487,173 issued Dec. 30, 1969. The memory arrangement of the system, and particularly the storage readout circuits SR for reading from temporary memory stores is disclosed in the U.S. patent application, Ser. No. 883,062 filed Dec. 8, 1969 by R. M. Thomas for a Memory Arrangement Having Both Magnetic-Core and Switching-Device Storage with a Common Address Register, hereinafter referred to as the Memory Arrangement application. A U.S. patent application Ser. No. 51,256 filed June 30, 1970 by H.P.Homonick now U.S. Pat. No. 3,618,015, issued Nov. 2, 1971, for Apparatus for Discriminating Between Errors and Faults, hereinafter referred to as the Fault Buffer application, discloses circuit details of some of the logic circuits shown herein by functional block diagrams. The switching network is disclosed in U.S. patent application, Ser. No. 54,138 filed July 18, 1970 by G. Verbaas now U.S. Pat. No. 3,624,305, issued Nov. 30, 1971 for a Communication Switching Network Hold and Extra Control Conductor Usage, hereinafter referred to as the Switching Network application. Some of the apparatus disclosed herein is covered by the following U.S. Patent applications: Ser. No. 102,414, filed Dec. 29, 1970 by J. P. Dufton and B. G. Hallman for Computer Having Associative Search Apparatus; Ser. No. 102,462 filed Dec. 29, 1970 by J. P. Dufton and J. H. Foster for Shift Apparatus for Small Computer; Ser. No. 102,413 filed Dec. 29, 1970 by R. M. Thomas and B. G. Hallman for Indirect Addressing Apparatus for Small Computer; and Ser. No. 192,828 (H-1363 filed Oct. 21, 1971 by J. P. Dufton for Stored Program Small Exchange with Registers and Senders.

DETAILED DESCRIPTION

Figure 1:
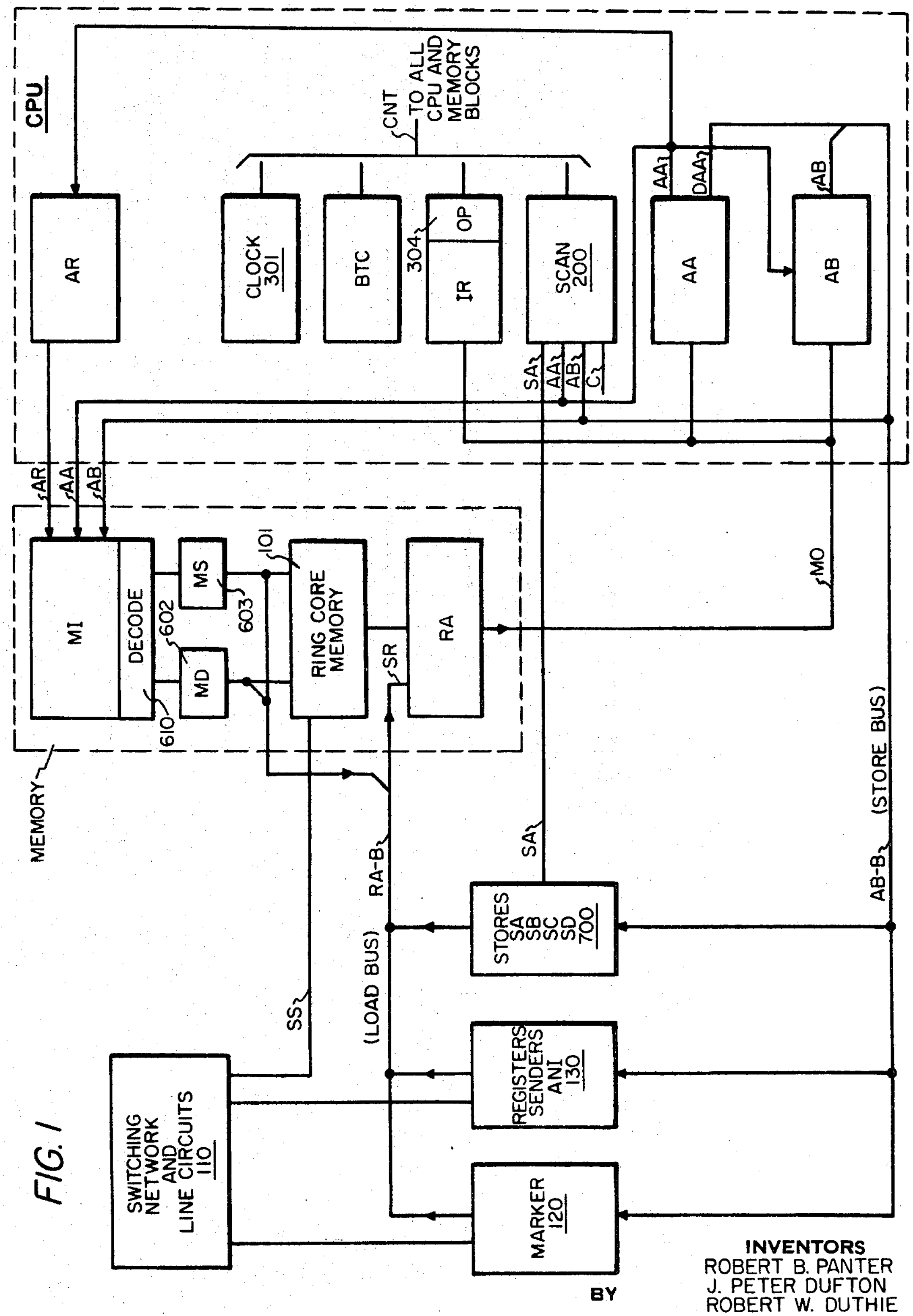
FIG. 1 is a block diagram of a telephone switching system, showing particularly the central processing unit, the memory, and subsystems which include temporary memory registers.

As shown in the block diagram of FIG. 1, the data processing system includes a memory and a central processing unit CPU. The central processing unit includes a clock 301 for supplying the basic timing signals, a bit time counter BTC which supplies the signals for the operation cycle for each instruction, an instruction register IR with an operation code (OP) decoder 304 which supplies the operation code for controlling the logic circuits, accumulator registers AA and AB, an address register AR and a SCAN unit 200.

The memory subsystem comprises basically a ring-core memory 101, with a memory input register MI having decoding circuits 610 for supplying input signals to memory drivers 602 and memory switches 603, and output read amplifiers RA. Storage registers (SA, SB, SC and SD) 700 may be considered to be part of the central processing unit, and are connected to the memory drivers and memory switches, and to the read amplifiers to form a portion of the temporary memory for the system.

The data processing system forms part of a telephone switching system to control a switching network and line circuits 110. A marker 120 contains registers forming part of the temporary memory of the system, and has circuits for controlling the switching network 110. The system also includes registers, senders and ANI (Automatic Number Identification) units 130 which also include registers forming part of the temporary memory, and have connections to the switching network 110.

Figure 6:
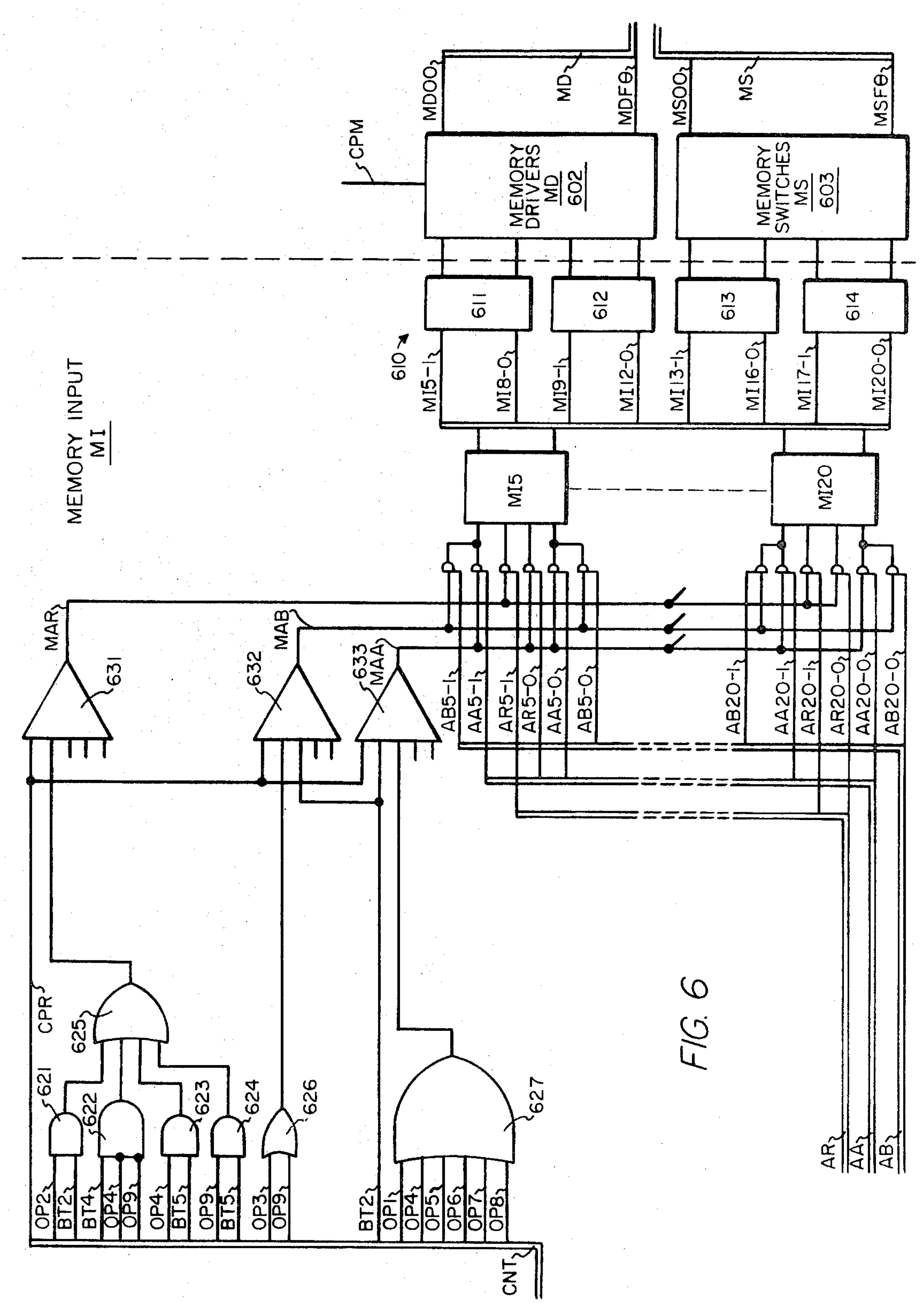
Figure 7:
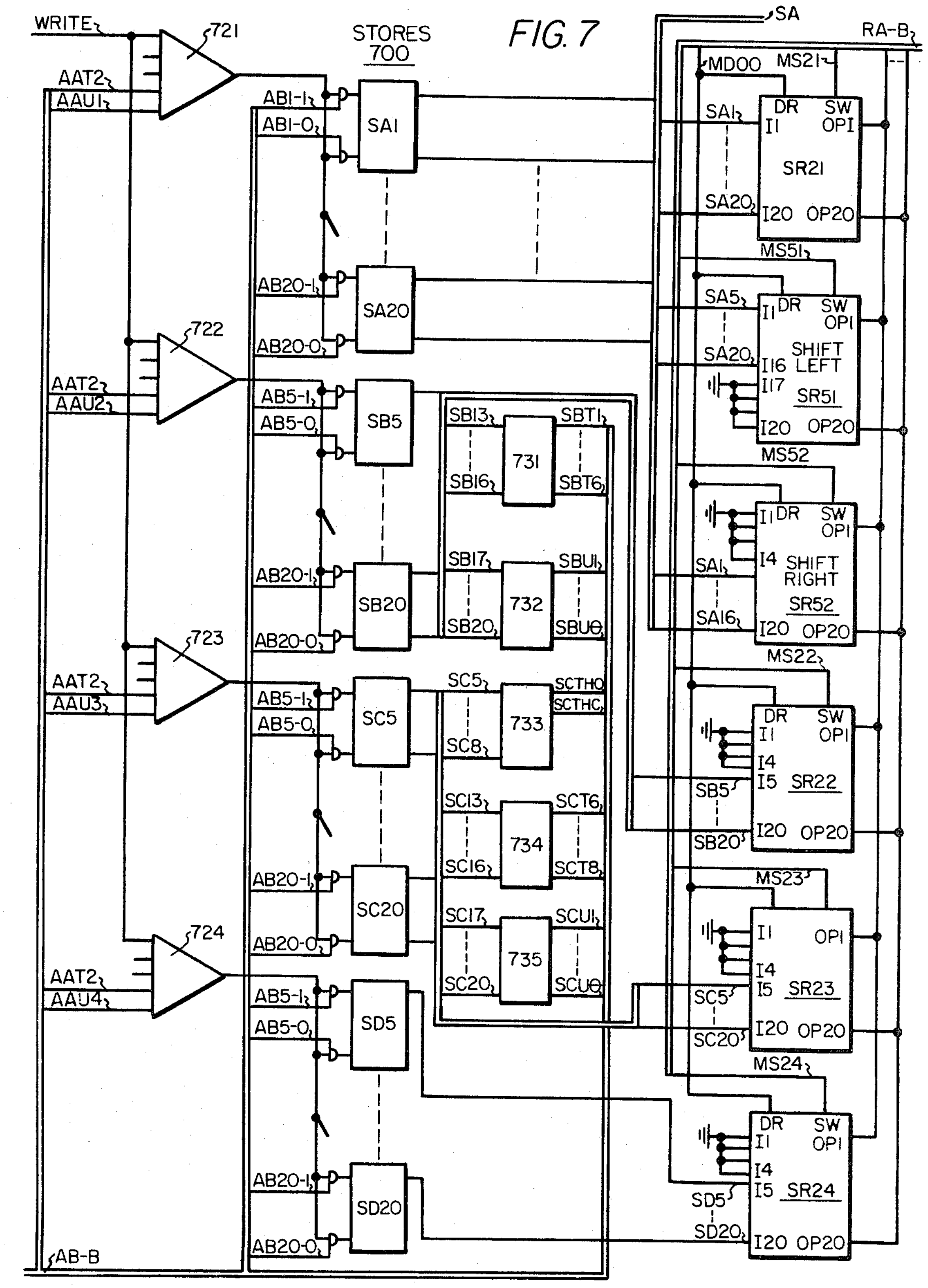

The arrangement shown in FIG. 1 represents a modification of Small Exchange Stored Program Switching System disclosed in said Duthie et al patent. In that patent the central processing unit is shown in FIGS. 6 and 7. The clock 301, bit time counter BTC and instruction register 303 with decoder 304 shown herein correspond to the clock 601, bit time counter 602, instruction register flip-flops IR1–4 and OP code decoder 605 shown in the patent. The address register AR corresponds to the current address counter comprising flip-flops CAC5–20 in the patent. The accumulator AA herein replaces the memory output register flip-flops MOR1–20 and the address portion IR5–20 of the instruction register of the patent. The accumulator AB herein corresponds generally to the accumulator flip-flops ACC1–20 and associated arithmetic circuits in FIG. 7 of the patent. The memory input register MI and decoding circuits 610 correspond generally to the circuits shown in FIG. 2 of the patent. The modifications of the memory output circuits as used in the system of FIG. 1 herein are disclosed in detail in the said memory arrangement patent application by Thomas. There are detailed modifications of all of the circuits of FIG. 1 with respect to those disclosed in the Duthie et al patent.

The basic logic circuits used herein are generally the same as those disclosed in the Duthie et al patent. The logic levels are a negative eight volts for "1," and ground potential for "0." An open circuit is also used for the logic level "1," the output of a logic module generally being from the unbiased collector electrode of a transistor which is in the cutoff condition for the "1" state, and the negative biasing potential being supplied at the inputs of the succeeding logic modules. The clock pulses as now used in the system comprise trains of negative pulses, which are a train of pulses on the lead CPM (FIG. 3) of three microseconds duration recurring every ten microseconds and a train of pulses or lead CPR of 0.7 microseconds, with the leading edge of the CPR pulses occurring in coincidence with the trailing edges of the CPM pulses. The actual logic circuits as used in the system are principally NOR gates, but are disclosed herein as AND and OR gates to improve the clarity. As stated at column 5 of the Duthie et al patent, some of the building block circuits are disclosed in U.S. Pat. No. 3,173,994, FIG. 21. The symbols for the AND and OR gates as used herein have been changed to conform to current practice. Referring for example to FIG. 4, block 413 represents an AND gate and block 415 represents an OR gate, with a circle at an input or output as shown for example at gate 414 representing an inversion or inhibit function. The gated pulse amplifier circuits such as 411 are generally similar to circuit 201 shown in FIG. 5 of the Duthie et al patent, except for the number of DC control inputs. The upper input of the circuit is an AC clock pulse input and the lower four inputs are DC control inputs connected as an AND function. Therefore when all four of the inputs are at the logic level "1" or open circuited a clock pulse at the upper input is gate and amplified to the output. The various decoding circuits generally comprise AND gates such as that shown in block 511 of the Duthie et al patent. The flip-flops such as AR5 have a number of set inputs shown on the left side on the upper half and a number of reset inputs shown on the left side on the lower half. Each input is from a coincidence gate represented by a small semicircle on which the input at the center left is an AC clock input and the input from the top or bottom of the left side is a DC control input, with the DC input required to be present for a certain time before the occurrence of the clock pulse input to be effective to change the state of the flip-flop.

There are several gates and gated pulse amplifiers actually used in the system, not shown herein, which are used for amplification and distribution of the signals. For example the busses include several such gating circuits to different groups of units, and also separately to odd and even numbered units for reliability. Thus connections disclosed and claimed herein, while shown as simple conductors, may in actual practice include circuits which repeat the signals.

A memory word comprises twenty bits organized as five digits of four bits each. For instruction words, the first digit is the operation code and the other four digits are an operand address.

The operation codes (OP codes) with their assembler mnemonics are as follows:

LOAD (OP 1) — read the contents of the operand memory address location and place the result in the accumulator AB.

STORE (OP 2) — write the contents of the accumulator AB into the operand memory address location.

TRANS (OP 3) — transfer the contents of the address location stored in the accumulator AB into the accumulator AB. (The operand part of the instruction is blank).

COMP (OP 4) — compare the contents of the accumulator AB with the contents of the operand address location as read into accumulator AA. If equal, proceed to the next instruction in sequence by incrementing the address register by 1 as normal. If unequal, skip one address in the program.

ADD (OP 5) — add 1, 10 or 100 (literals stored at operand address location) to the contents of the accumulator AB.

BR (OP 6) — branch to the instruction at the operand address location.

MASK (OP 7) — mask the contents of the accumulator AB with the contents from the operand address location as read into accumulator AA. Keep the digit where one's are present and set to zero where zero's are present (logical AND).

SUPER (OP 8) — superimpose on the accumulator AB the contents of the operand memory address as read into accumulator AA (logical OR).

SCAN (OP 9) — make an associative search beginning with the address in the accumulator AB. (The operand part of the instruction is blank). When the contents of the accumulator AA compare with the contents of the storage register SA, the search is completed and the next address is used. When the contents of accumulator AB and a wired constant C compare, skip one address in the program. Note that the necessary data must be placed in the register SA and the accumulator AB before this OP code is called upon.

Figure 2:
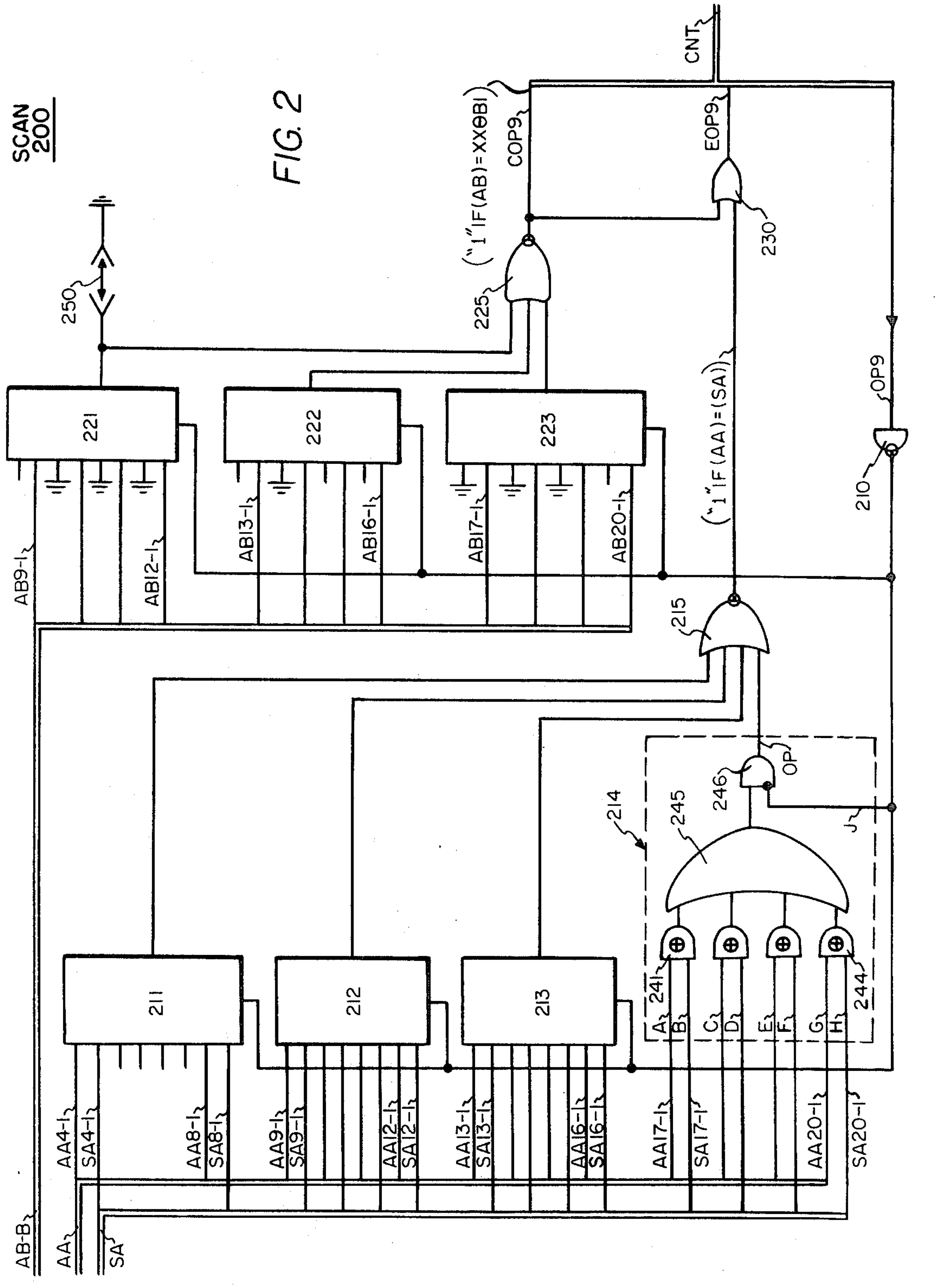
FIG. 2 is a functional block diagram of the comparators used for the operation code SCAN.

The comparison circuits for the SCAN operation are shown in FIG. 2. The basic comparison modules 211–214 and 221–223 each provide for comparing one set of four inputs to a corresponding set of four inputs. These modules may be of the type disclosed in U.S. Pat. No. 3,478,314 by W. R. Wedmore for a Transistorized Exclusive-OR Comparator. Block 214 is a symbolic functional equivalent of the module. It includes four exclusive OR gates 241–244, followed by an OR gate 245 and an output inhibit AND gate 246 to the output conductor OP. Each of the exclusive OR gates comprises a transistor with the two inputs connected via resistance and diode bias circuits to the base and emitter electrodes, the collector electrodes of the four transistors are connected together at a common point, and thence through a resistance-capacitance network to the base electrode of an output transistor, and the collector electrode of this last transistor is connected to the output lead OP. Another input from a terminal J is connected through a resistance network to the base electrode of the output transistor to act as an inhibit input. The Boolean equation for the Wedmore circuit or for the generally equivalent logic of block 214 is:

$$OP=\bar{J}(A\bar{B}+\bar{A}B+C\bar{D}+\bar{C}D+E\bar{F}+\bar{E}F+G\bar{H}+\bar{G}H)$$

The outputs of the four comparator modules 211–214 are connected to respective inputs of a NOR gate 215. The J inputs of the four modules are connected in common to the same source. The result is that if the logic level at input J is "0" and the signals on two sets of inputs compare so that each signal in one set is equal to its respective signal in the other set then the output of the NOR gate 215 is a "1." The specific inputs in this case are the set of conductors AA (from accumulator AA) and the set of conductors SA (from the store register SA). For the particular system requirements the first comparator module 211 has its upper pair of inputs connected to the leads from the fourth bit position of each of the conductor sets AA and SA and its lower pair of inputs to the eighth bit positions; while the inputs of the other three comparator modules run from the ninth bit position of each set at the upper inputs of module 212 to the leads from the twentieth bit position of each set at the lower inputs of module 214; corresponding to the last three digit positions of the data stored in the accumulator AA and the storage register SA.

The three comparator modules 221–223 along with NOR gate 225 are used in a similar manner to compare the contents of the last three digit positions of the accumulator AB with a wired constant. The specific constant shown has the value 0B1 corresponding to the binary number 1010 1011 0001, with the 1's and 0's provided by open circuit and ground potentials respectively. Thus if a five digit number is stored in the accumulator AB, the first two digits may be any value as far as operation of comparator is concerned which may be indicated by an X; so that the output of NOR gate 225 has the value of "1" if the contents of the accumulator AB has the value XX0B1. This signal appears on the lead COP9 in FIG. 2.

To appreciate the significance of the particular constant, please note that the sixteen possible values for the four-bit binary coded digit are as explained in column 7 of the Duthie et al patent are 0 for the null value 0000, followed by the values 1–9, then 0 for the value 1010 followed by the values B–F in which the bits have the weight 8–4–2–1. The symbol 0 is used to correspond to the 0 of telephone directory numbers because it us usually transmitted as 10 pulses in dialing. Thus each digit position of a directory number may have any one of the ten values 1–0, and for a block of a thousand numbers they may have the value X111–X000. Thus if a block of one thousand numbers is being scanned the last number would have the value X000. The operation of the counting circuits is such that the last three digits for the next count would have the value 0B1; so that this constant indicates that all thousand numbers have been scanned and the counter has advanced to the next step.

An option is provided in the comparison circuits to connect the output of the comparator module 221 via a strap 250 to a ground terminal, which has the effect of eliminating the corresponding digit from the comparison so that only the last two digits are compared and the constant becomes equal to XXXB1, which permits one hundred numbers to be scanned at a time.

The J inputs of both sets of comparator circuits 211–214 and 221–223 are connected via the output of an inverter 210 from the conductor OP9 from the instruction register decoder. The outputs from the two NOR gates 215 and 225 are connected to respective inputs of an OR gate 230, the output of which is connected to a conductor EOP9. Thus when the signal OP9 is "1;" and when the contents of accumulator AB has its last three digits (or two digits if the wired option is used) are equal to the constant the signals on leads COP9 and EOP9 both become "1;" and when the contents of accumulator AA compare to the contents of the store register SA the output of NOR gate 215 is "1" which causes the signal on lead EOP9 to also be "1."

In an alternative embodiment now shown the inputs for the constant at the comparator modules 221–223 may be connected to the outputs of another temporary memory register, so that any desired constant may be stored therein under programmed control for use in making the comparison.

Figure 3:
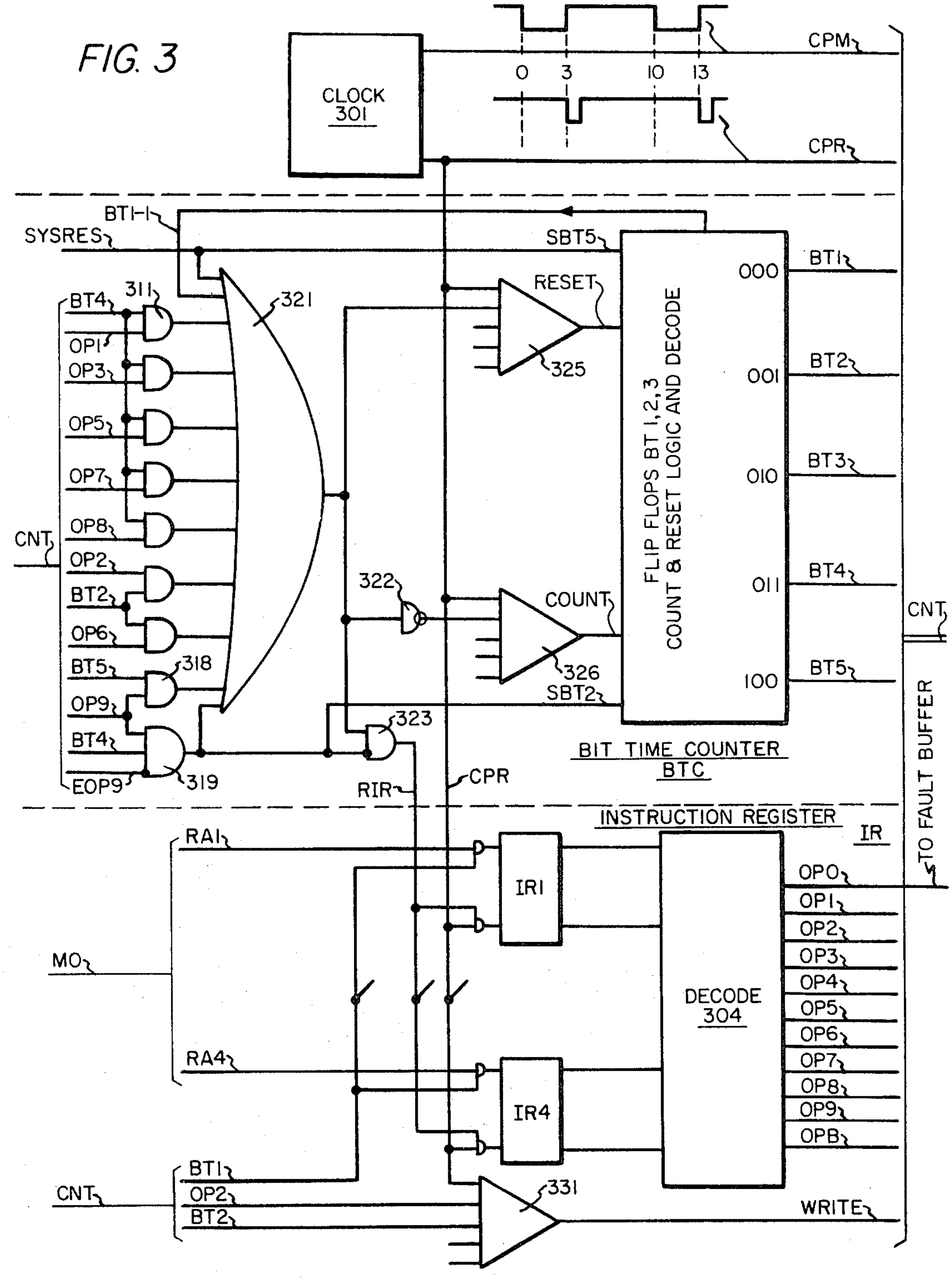
FIGS. 3–7 are functional block diagrams of the registers and logic circuits of other portions of the central processing unit, of the memory, and of general storage registers.
Figure 4:
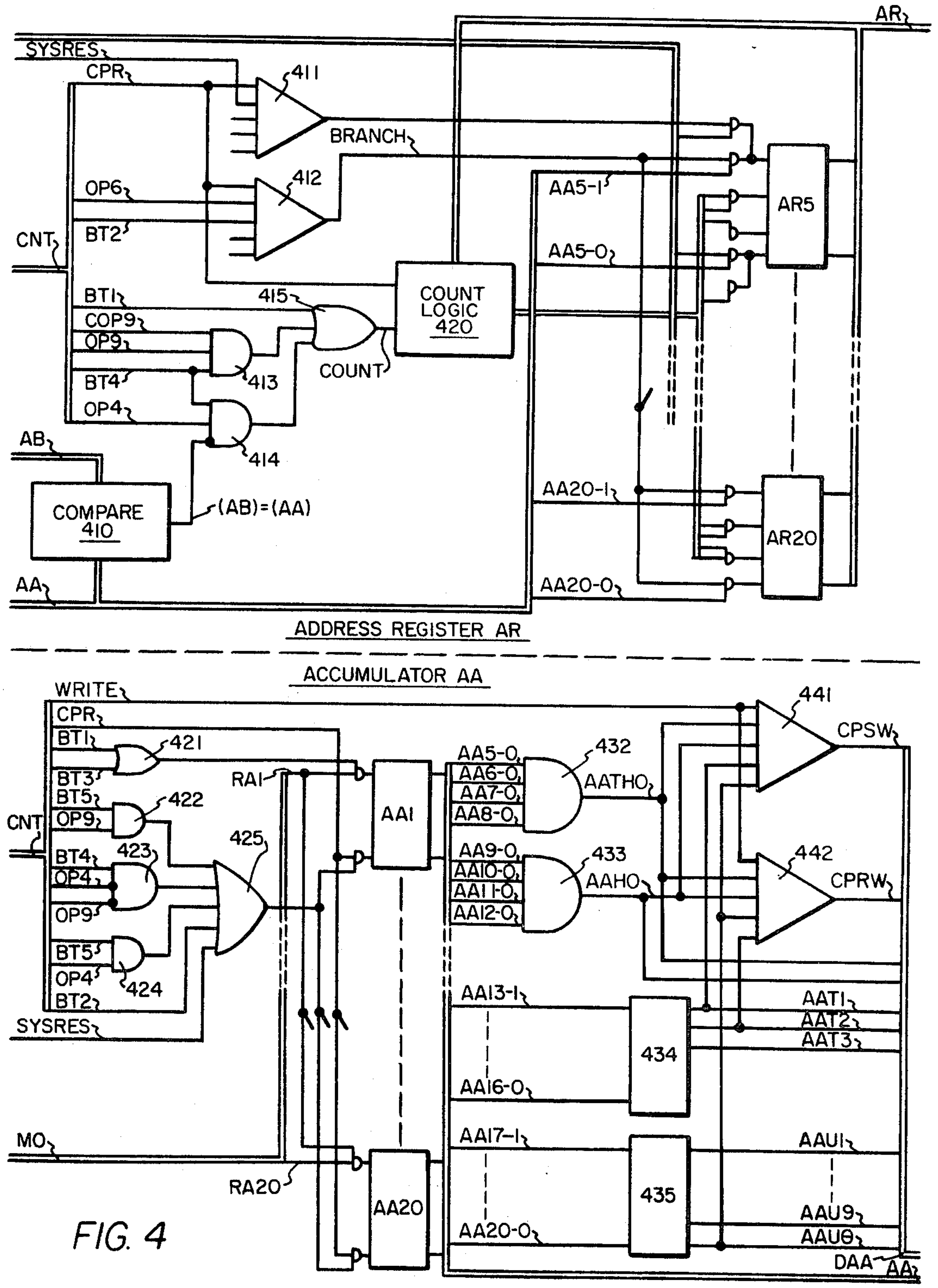

In FIG. 3 the clock is shown as block 301 which supplies the recurring pulse trains as indicated by the graphs on lead CPM and CPR. The pulses on lead CPM are used principally to enable the memory driver circuits, and the pulses on lead CPR are used as AC inputs to the gated pulse amplifiers and the coincidence gates of the flip-flops to control the timing of the change of state.

The bit time counter BTC counts from one to five. Every operation (OP) code begins with bit time BT1 and the counter advances by one on every CPR clock pulse. However some operations can be conducted in fewer bit times than others. The counter comprises three flip-flops BT1, BT2, and BT3, which along with the counting and reset logic and decoding circuits is represented by block 310. The states of the flip-flops for each output state are shown along the right side of this block, the state 000 being decoded as output BT1, etc. up to the state 100 being decoded as output BT5. The counter advances by one or resets on each pulse from lead CPR as controlled by the gated pulse amplifiers 325 and 326. Normally the output of OR gate 321 is at the level "0" so that the gated pulse amplifier 325 is inhibited and gated pulse amplifier 326 is enabled via inverter 322, so that the counter advances on each occurrence of a pulse on lead CPR. Reset is controlled by gates 311–319 connected to the inputs of OR gate 321. State BT4 causes resetting for codes OP1, OP3, OP5, OP7 and OP8; state BT2 causes resetting for codes OP2 and OP6, and for code OP9 the resetting may occur either with state BT4 or BT5. Also any time the flip-flop BT1 is in the set state, which will only occur for state BT5, the signal on lead BT1-1 will cause reset. The system reset signal on lead SYSRES also enables the reset and via the signal on lead SBT5 in conjunction with the signal on lead RESET forces the counter to state BT5. A signal on lead SBT2 in conjunction with the signal on lead RESET will force the counter to state BT2.

Code OP9 is the only operation code which will cause the bit time counter to reset to a state other than BT1. If comparison is not found, that is the contents of accumulator register AA are not the same as the contents of the storage register SA, and the address in the accumulator AB is not equal to the constant, then the signal on lead EOP9 is at "0;" so that during the state BT4 gate 319 has at its output the signal condition "1." This causes the signals on leads SBT2 and RESET to be "1" so that the counter is set to state BT2. When either comparison indicates equality, then the signal on lead EOP9 is at signal level "1" so that gate 319 is inhibited and the counter advances to state BT5. Then on the next clock pulse the output from gate 318 will produce the reset condition to change the state to BT1. Thus it may be seen that when the central processor is in the state with code OP9, which is the SCAN mode, the bit time counter recycles skipping state BT1 and goes directly from state BT4 to BT2. Since state BT1 is the state for reading instructions from the memory, no instruction is read and the processor remains in the same state OP9.

The instruction register IR comprises four flip-flops IR1–4. This register receives information in parallel from the memory output read amplifiers via leads RA1–4 during interval BT1, the signal on lead BT1 supplying the DC input to the set coincidence gates, and the signals on leads RA1–4 supplying the AC inputs to load the flip-flops. The information stored in these flip-flops is the operation (OP) code, which is decoded by the logic 304. The output on lead OP0 is an invalid code which indicates that in instruction was not read, probably due to an open diode or other fault in the memory; so this output is used by the fault buffer. The outputs OP1–OP9 correspond to the operation code previously described. Since the digit comprises four bits the output could be expanded to a maximum of 15 outputs other than the zero output. One such additional output OPB is shown.

A reset control from gate 323 associated with the bit time counter BTC provides a means of setting the instruction register back to zero after the execution of each instruction by supplying a DC input to the reset coincidence gates, with the lead CPR connected to the AC inputs to clock the reset. Note that the reset command is supplied whenever a signal is received from the OR gate 321 for resetting the bit time counter flip-flops; except that it is inhibited by the output of gate 319 during the SCAN operation for code OP9. This permits the instruction register to remain set at the state OP9 while the bit time counter cycles skipping the interval BT1.

A gated pulse amplifier 331 enabled by DC signals on leads OP2 and BT2 gates a clock pulse from lead CPR to generate a signal on lead WRITE, which is used to write the information into the temporary memory flip-flops during the STORE operation.

The outputs of the clock 301, the bit time counter BTC and the instruction register IR are shown combined as a set of conductors CNT, at least some of these signals being used by most of the other blocks of a central processing unit and also the memory input register.

The address register AR in FIG. 4 stores the address to be executed next. It comprises flip-flop AR5–20 and associated logic circuits. The count logic circuits 420 cause the address to be incremented by one during the occurrence of a pulse on lead CPR when the signal on lead COUNT is "1," which occurs via OR gate 415 every cycle during the first bit time interval by the signal on lead BT1, and also conditionally during interval BT4 for the execution of codes OP4 and OP9.

The compare logic for code OP4 shown as block 410 (which is not part of the address register but is shown here for convenience) compares the contents of the accumulator registers AA and AB, and supplies an output signal which inhibits gate 414 when the comparison indicates that the contents are equal. Thus if a comparison is true the register advances only once during the cycle on the occurrence of a signal on lead BT4 as normal and the next instruction in sequence is executed next; while if the comparison indicates an inequality of the two sets of data, gate 414 is not inhibited so that during the occurrence of signal on lead BT4 the register is advanced an additional step causing one instruction to be skipped.

During the SCAN operation (OP9) the address register is incremented once during the first cycle when the instruction is read during the interval BT1 as normal, and during subsequent cycles the interval BT1 is skipped by the bit time counter so that the address register does not advance further. The end of the operation occurs when a comparison is found in FIG. 2 either via gate 215 or 225, which can never occur at the same time. A "1" output from gate 215 indicates that the associative search has been completed by finding the word having the data corresponding to that in the register SA; in which case no further signal is supplied to the address register and the instruction already there is used next. However, if the address stored in accumulator AB which corresponds to the wired constant is reached, then the signal on lead COP9 at gate 413 during the occurrence of interval BT4 causes the address register to be incremented one additional step, so that an instruction is skipped. This causes entering a segment of a program to store data indicating that the search should be continued at a later time in the program, or that the search is to be terminated upon not finding a matching condition.

The branch instruction command OP6 along with the signal on lead BT2 is used to enable gated pulse amplifier 412 to pass a pulse from lead CPR to supply AC signals to set and reset inputs of the flip-flops to load data from the accumulator AA.

In addition the reset signal on lead SYSRES enables gated pulse amplifier 411 to supply reset signals to set the register to designated start addresses for the main or standby programs.

The accumulator AA comprises twenty flip-flop AA1–20. This register receives the information in parallel from the memory output read amplifiers via the twenty leads RA1–20 to the AC set inputs; the DC inputs being enabled during bit time intervals BT1 and BT3 via OR gate 421. The register is reset by a pulse on lead CPR when the reset DC inputs are enabled by a signal from OR gate 425; which occurs during interval BT2 of every cycle, during interval BT5 for the codes OP9 and OP4 via gates 422 and 424 respectively, during interval BT4 for all other operation codes via gate 423, and also when the system reset signal is present on lead SYSRES.

The output of accumulator register AA is also used for the STORE operation code OP2 during the interval BT2 as the operand address indicating into which register the information from accumulator AB is to be written. The output for the digit AA5–8 is decoded by gate 432 as the thousands digit on lead AATH0, and for the digit AA9–12 by gate 433 as the hundreds digit on lead AAH0, since these two digits for the temporary addresses are always 00. The digit AA13–16 is decoded by logic 434 to provide the tens digits AAT1, or AAT3; and the digit AA17–20 is decoded by logic 435 to provide a units digit signal on one of the leads AAU1–AAU$\theta$.

Figure 5:
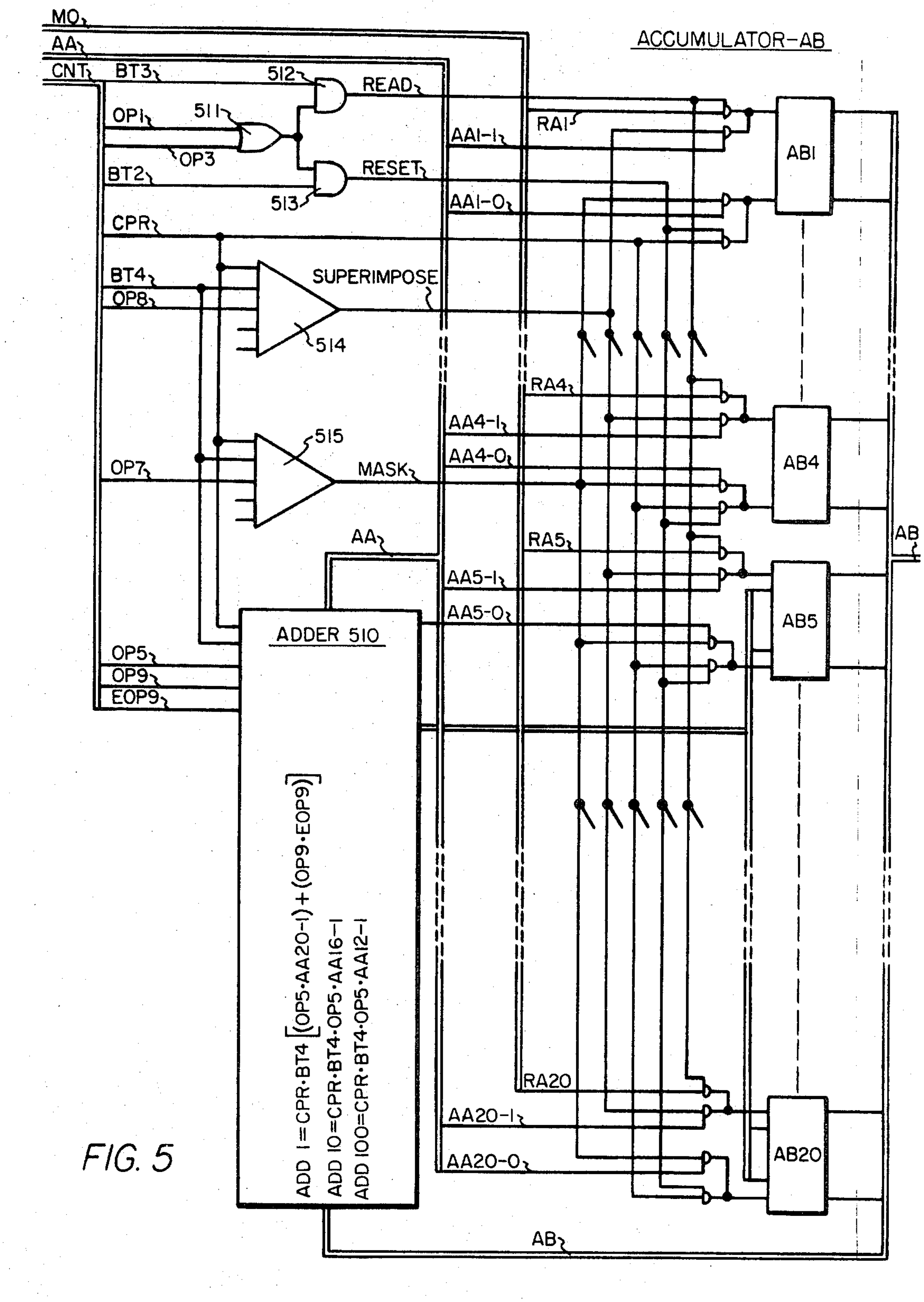

The accumulator AB shown in FIG. 5 comprises 20 flip-flops AB1–20. This register stores the output result for most of the operations, and also supplies part of the input data for many of them.

For the load and transfer operations, accumulator AB receives information directly from the memory output read amplifiers via the conductors RA1–20 to the AC inputs of one set of coincidence gates. For these operations the code OP1 or OP3 via OR gate 511 enables gates 512 and 513 so that during the bit time interval BT2 gate 513 supplies DC reset commands to a set of coincidence gates to reset all of the flip-flops on the occurrence of a pulse on lead CPR, and then during the interval BT3 gate 512 supplies a read command to the DC inputs of the set coincidence gates to load the information from the memory output.

Adder logic 510 provides the addition logic indicated by the Boolean equations within the box. This logic includes set and reset coincidence gates for the flip-flops AB5-20 having AC inputs from lead CPR, and logic for the DC inputs thereof which is actuated during bit time BT4 to add 1, 10 or 100 to the contents of the flip-flops AB5–20. For the add operation OP5, the data 1, 10 or 100 is stored in accumulator AA as a bit in the corresponding one of the flip-flops AA20, AA16 or AA12 respectively. For the SCAN operation OP9, the address in flip-flops AB5–20 is incremented by one during bit time BT4 as long as the signal on lead EOP9 has a value "0."

The mask and superimpose operations OP7 and OP8 control the gated pulse amplifier 515, 514 respectively during the interval BT4 to supply a clock pulse from lead CPR to the AC inputs of coincidence gates to cause information from accumulator AA at the DC inputs of the coincidence gates to be masked via reset inputs, or superimposed via set inputs respectively.

The memory input register MI comprises flip-flops MI5–20, as shown in FIG. 6. The instruction for the next cycle is transferred from the address register AR via the leads AR5–1 to AR20–0 inclusive connected to the DC inputs of respective coincidence gates; which are clocked via signals from gated pulse amplifier 631 when enabled by a DC signal from OR gate 625, which occurs during bit time BT2 for code OP2 via gate 621, during bit time BT5 during codes OP4 or OP9 via gates 623 or 624 respectively, and for other codes during bit time BT4 via gate 622.

The data address from accumulator AB is transferred via DC inputs of set and reset coincidence gates which receive AC input pulses from gated pulse amplifier 632 when enabled during bit time BT2 and the operation codes OP3 or OP9 via OR gate 626.

The data address from accumulator register AA is transferred via DC inputs of set and reset coincidence gates which are clocked via a signal from gated pulse amplifier 633 when enabled during bit time BT2 and any of the operation codes OP1, OP4, OP5, OP6, OP7 or OP8 via OR gate 627. The output of the memory input register is decoded via the circuits 610 comprising logic circuits 611 for the first address digit from flip-flops MI5–8, decoding logic 612 for the second address digit from flip-flops MI9–12, via decoding logic 613 for the third digit from flip-flops MI13–16, and decoding logic 614 for the fourth digit from flip-flops MI17–20. The first two digits are used by the memory drivers 602 which require an enabling clock pulse on lead CPM. The last two digits are used by the memory switches 603.

As shown in FIG. 7, a storage register SA comprising flip-flops SA1–20 has an address 0021, a storage register SB comprising flip-flops SB5–20 has an address 0022, a storage register SC comprising flip-flops SC5–20 has an address 0023, and a storage register SD comprising flip-flops SD5–20 has an address 0024. Date may be stored in these registers from the accumulator AB via connections to the DC inputs of set and reset coincidence gates as shown. During the store operation in interval BT2 the signal on lead WRITE from gated pulse amplifier 231 (FIG. 3) supplies a clock pulse to the four gated pulse amplifiers 721–724. If one of these gated pulse amplifiers has its address stored in accumulator AA the signals from the set of conductors DAA via bus AB–B enables its DC inputs so that the clock pulse is gated to the AC inputs of the coincidence gates of the corresponding storage register to cause a transfer of the data from accumulator AB. To load information from one of these storage registers into the accumulator AB during the load operation one of the storage readout circuits SR21–SR24 is used. These storage readout circuits are disclosed in said Memory Arrangement patent application by R. M. Thomas. Each of them has an input shown via bus RA–B from the memory driver MD00, and from the memory switches on one of the leads MS21–MS24 corresponding to the last two digits of its address. When both the memory driver and the memory switch of one of the storage readout circuits is enabled the data from the corresponding storage register is supplied via the set of conductors comprising bus RA-B to the read amplifiers 102 (FIG. 1) and then via the memory output bus MO to accumulator AB.

The output from the flip-flops SA1–20 is also supplied via the set of conductors SA to the scan unit 200 for use in the SCAN operation OP9.

Special storage readout circuits SR51 and SR52 are also provided for shift left and shift right operations using the contents of storage register SA. Thus the load instruction OP1 with address 0051 (instruction 10051) will cause the contents of the storage register SA to be loaded into accumulator AB shifted one digit (four bits) to the left, that is the bits SA5–20 are loaded into flip-flops AB1–16 and zero's are loaded into flip-flops AB17–20.

In like manner the storage readout circuit SR52 may be used to shift the information from storage register SA one digit (four bits) to the right. Thus the instruction 10052, which provides the code OP1 and the address 0052, causes the storage readout circuit SR52 to be enabled to transfer the information from flip-flops SA1–16 into the accumulator register AB flip-flops AB5–20, and a digit zero will appear in flip-flops AB1–4.

Note that for additional parallel shift operations, the contents of accumulator AB must be stored in storage register SA before the shift instruction is repeated.

Indirect Addressing of Registers, Senders and Automatic Number Identification units Indirect addressing with permanently wired addresses is used for the registers, senders and automatic number identification units shown as block 130 in FIG. 1. The indirect addressing apparatus comprises gated pulse amplifiers 441 and 442 shown in FIG. 4, and the store registers SB and SC along with decoding circuits 731–735 shown in FIG. 7. Indirect addressing is used only for the write-control operation using the STORE code OP2; direct addressing of the same store registers being used for the read-control operations using the LOAD code OP1 or the TRANS code OP3. The operand addresses 001$\theta$ and 002$\theta$ are used for indirect addressing, which enable the gated pulse amplifiers 441 and 442 respectively. Thus the output of decoding gate 432 supplies the signal AATHO supplying the thousands digit, decoding gate 433 supplies the signal AAHO which is the hundreds digit, the decoding circuits 434 supply the ten digits AAT1 and AAT2, and the decoding circuits 435 supply the units digits AAU$\theta$for the D.C. inputs of these gated pulse amplifiers. During a STORE operation the gated pulse amplifier 331 (FIG. 3) is enabled by the signals on leads OP2 and BT2 to gate the clock pulse on lead CPR to lead WRITE, connected to the clock pulse inputs of the gated pulse amplifiers 441 and 442, which have the respective output leads CPSW and CPRW. Thus when one of these gated pulse amplifiers is addressed during a STORE operation a clock pulse appears on its output.

The address of a store being indirectly addressed is placed in either store register SB or store register SC. As shown in FIG. 7 the store register SB comprises flip-flops SB5–SB20, with the output of flip-flops SB13–SB16 being decoded by circuits 731 to supply the tens digits SBT1-14 SBT6, and the output of flip-flops SC5–SC20, with the thousands digit from the output of flip-flops SC5–8 decoded by circuit 733 to supply either the thousands digit SCTHO or SCTHC, the output of flip-flops SC13–16 is decoded by circuit 734 to supply the tens digit on one of the six output leads SCT6-SCTB, and the output of flip-flops SC17-20 is decoded by circuit 735 to supply the signal on one of the ten output leads SCU1–SCU$\theta$.

For purposes of the STORE operation, the stores of the registers, senders and automatic number identification units may be grouped into two sets, one set comprising a directory number store and an equipment number store for each of 22 dial registers; and the other set comprising a directory number store and a sender number store for each of eight automatic number identification units, and four stores for each of 10 senders. Each of these stores has its own individual gated pulse amplifier which may be designated as an "input control gate" for the store, with the gated pulse amplifiers 441 and 442 designated as "special control gates" for indirect addressing. Each of the gated pulse amplifiers such as 1011 for the set of stores associated with the dial registers has its clock pulse input connected to lead CPRW and has individual inputs from the store register SB decoding circuits for the tens and units address digits. The thousands and hundreds digits for all of these stores are CO and therefore the decoding connections are not necessary, but could be decoded and connected to the gated pulse amplifiers if desired.

Programming with Indirect Addressing

To store information into one of the dial register directory or equipment number stores, the address of the store is first placed in the store register SB using the assembler instruction STORE SB, (machine instruction 20022), and then instruction STORE RG (machine instruction 2002θ) is used which in execution enables the gated pulse amplifier 442 to supply a pulse via lead CPRW to the gated pulse amplifiers of all of the dial register stores, the one designated by the tens and units digits decoded from STORE SB being enabled to store the data from the accumulator into the store addressed. Similarly to store data into any one of the sender stores or ANI stores, the address of the store is first placed in store register SC, using the instruction STORE SC (machine instruction 20023), and then the instruction STORE SN (machine instruction 2001θ) is used, which in execution enables the gated pulse amplifier 441 to gate a pulse via lead CPSW to all of the gated pulse amplifiers of the sender and ANI unit stores, the one with the decoded address digits from store SC being enabled to store the data from the accumulator AB via the store bus into the addressed store. To place data from any one of the register, sender, of ANI unit stores into the accumulator, the transfer operation code TRANS (OP3) is used. In this operation, program instructions are first used to place the address of the desired store into the accumulator AB, and then the transfer operation instruction causes the data at that address to be read into the accumulator AB.

Note that with the indirect addressing technique described herein, it is not necessary in the program to use actual addresses of the stores of the registers, senders, or ANI units except for the first and in some cases the last numbered one. The program can be written in a loop with the store number appropriately incremented in performing various operations, and then the indirect addressing program technique for write-control, or the transfer operation for read-control, is used to write information into the appropriate store or read it out therefrom.

Register-Sender and ANI Apparatus

Figure 8:
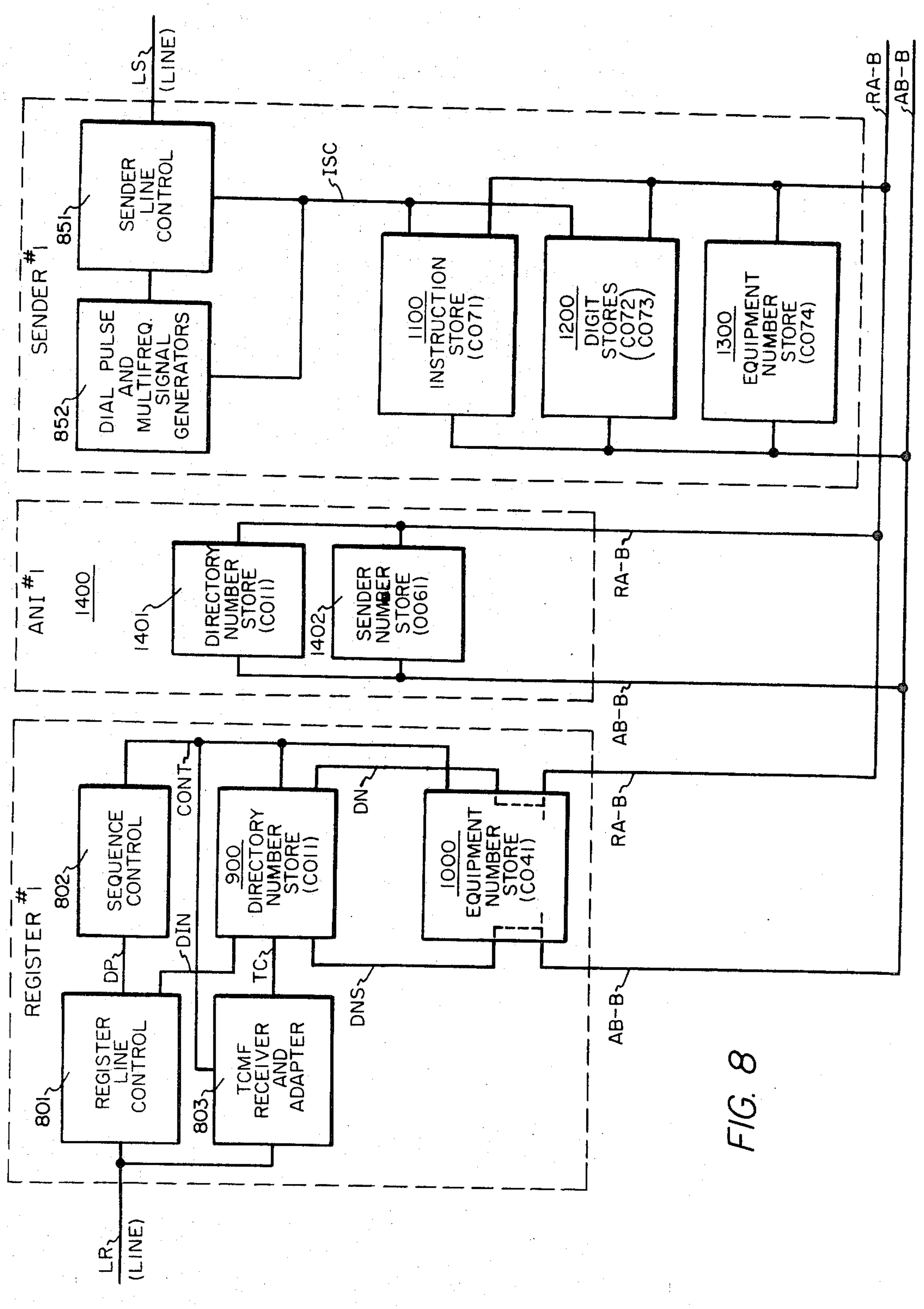
FIG. 8 is a single line block diagram of one register, one sender, and one automatic number identification unit.

FIG. 8 is a single line block diagram of one of the dialing registers, one of the senders and one of the automatic number identification (ANI) units. Each of the registers has a directory number store 900 and an equipment number store 1000 which for register No. 1 have the addresses CO11 and CO41 respectively; and also a register line control circuit 801, sequency control circuit 802 and a touch calling receiver and adapter 803.

Each of the senders includes an instruction store 1100, two digit stores 1200 and an equipment number store 1300 which for sender No 1 have the addresses CO71, CO72, CO73 and CO74 respectively; and also a sender line control circuit 851 and circuits for dial pulse and multifrequency signal generators 852.

Each of the automatic number identification units 1400 has a directory number store 1401 and a sender number store 1402 which for ANI unit No. 1 have the addresses 0071 and 0061 respectively.

Each of the stores is coupled to the store bus AB–B to store data therein from the accumulator, and to the load bus RA–B to read data from the stores into the accumulator.

The store address numbers for registers and senders, which use the memory driver CO (the thousands and the hundreds digits of the address) are as follows:

REGISTER NUMBERS (22 Registers)

| Reg. | DN | EN |
|---|---|---|
| 1 | CO11 | CO41 |
| . | . | . |
| . | . | . |
| . | . | . |
| 10 | CO1θ | CO4θ |
| 11 | CO21 | CO51 |
| . | . | . |
| . | . | . |
| . | . | . |
| 20 | CO2θ | CO5θ |
| 21 | CO31 | CO61 |
| 22 | CO32 | CO62 |

SENDERS (10 Senders)

| DS Sender IS No. 1 | DS No. 2 | EN | Spare |
|---|---|---|---|
| 1 CO71 CO72 | CO73 | CO74 | CO75 |
| 2 81 82 | 83 | 84 | 85 |
| 3 91 92 | 93 | 94 | 95 |
| 4 COθ1 COθ2 | COθ3 | COθ4 | COθ5 |
| 5 B1 B2 | B3 | B4 | B5 |
| 6 76 77 | 78 | 79 | 7θ |
| 7 86 87 | 88 | 89 | 8θ |
| 8 96 97 | 98 | 99 | 9θ |
| 9 θ6 θ7 | θ8 | θ9 | θθ |
| 10 B6 B7 | B8 | B9 | Bθ |

The various store addresses using the memory drivers MDOO, (the thousands and hundreds digits), are as follows:

| Stores | | | | | Units | | | | | |
|---|---|---|---|---|---|---|---|---|---|---|
| | 1 | 2 | 3 | 4 | 5 | 6 | 7 | 8 | 9 | θ | |
| Tens: | | | | | | | | | | | |
| 1 | MA | MB | MC | MD | ME | MF | TA | TB | TC | SN | — Marker stores |
| 2 | SA | SB | SC | SD | | | | | | RG | — Temporary stores |
| 3 | PA | PB | PC | PD | PE | PF | PG | PH | PJ | | — Printer stores |
| 4 | XA | XB | XC | XD | | | | | TR | TD | — Rotary switches |
| 5 | SALF | SART | | | | | | | | | |
| 6 | ANI #1 | ANI #2 | ANI #3 | ANI #4 | ANI #5 | ANI #6 | ANI #7 | ANI #8 | ANI #9 | ANI #10I | ANI sender number store |
| 7 | ANI #1 | ANI #2 | ANI #3 | ANI #4 | ANI #5 | ANI #6 | ANI #7 | ANI #8 | ANI #9 | AN #10 | ANI directory number store |

The stores designated with an M are a part of the marker, the stores designated with a P are associated with the printer subsystem, the stores designated with an X are rotary switches on the control panel, stores TA, TB and TC are peg count buffers, store TR is for a test routine request, and store TD is for the traffic distributor. The symbol RG is a register write mnemonic for the address 002θ, and the symbol SN is a sender write mnemonic for the address 0010.

Dialing Register Apparatus and Operation

Figure 9:
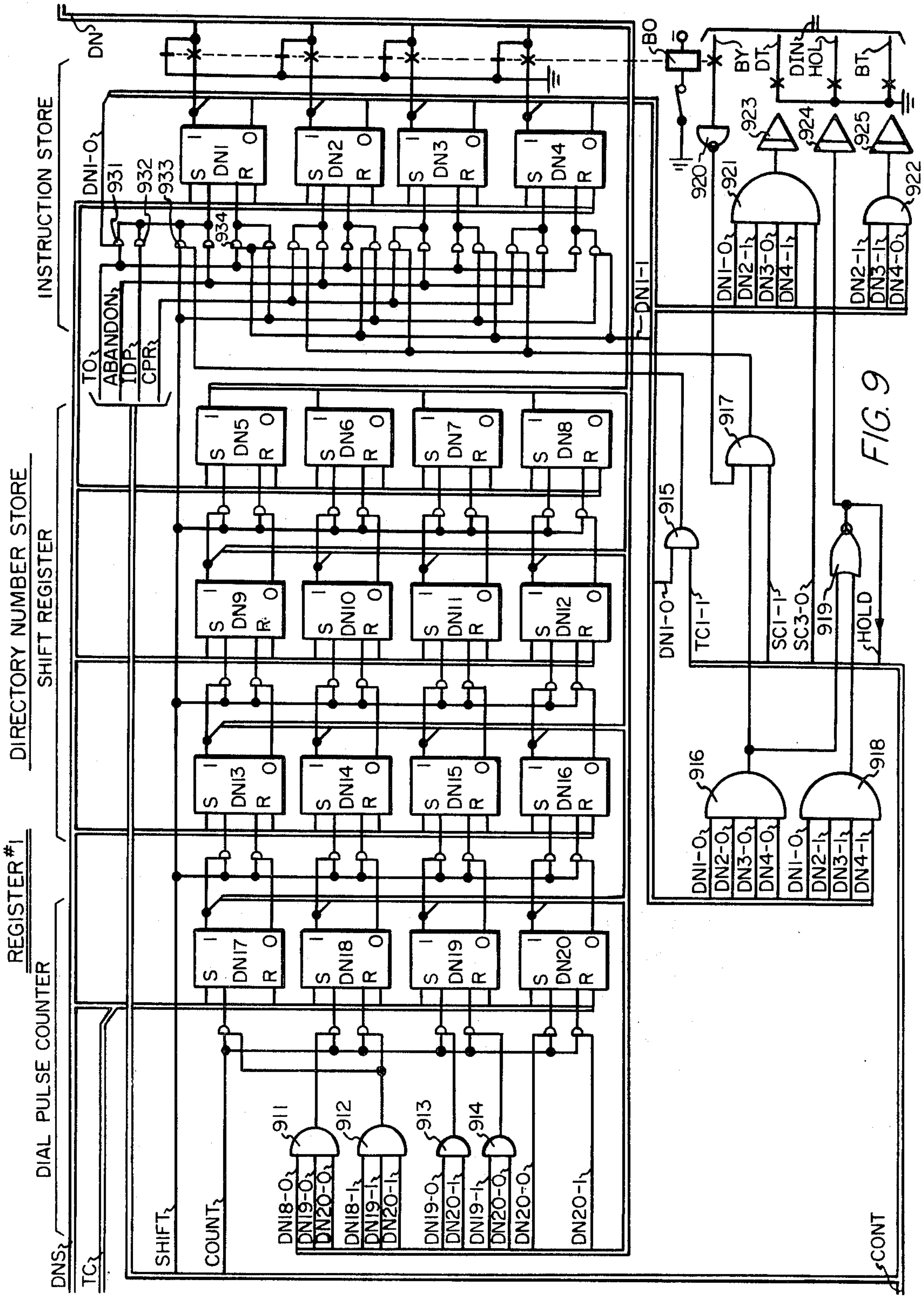
FIGS. 9 and 10 are functional block diagrams of the stores associated with the dialing register.

The directory number store for dialing register No. 1, shown in FIG. 9, comprises twenty flip-flops DN1–20. Flip-flops DN1–4 are used as an instruction store, flip-flops DN17–20 are used as a dial pulse counter, and flip-flops DN5–16 are used as a shift register for the dialed digits, digits being accumulated in the flip-flops DN17–20 and then during each interdigital pause each digit being shifted up one digit position. There are also various control logic circuits 911–925 associated with the directory number store shown in FIG. 9. The input gates for the write-control STORE operation, and the storage readout circuit for the read-control operations are shown in FIG. 10, and connected by the sets of conductors DNS and DN respectively.

The instruction store and decoder in FIG. 9 comprises flip-flops DN1–4 and the logic circuits 915-925. These are used for storing the instruction which governs the operation of the register. Flip-flop DN1 functions as a "call-for-service" bit. A "1" is stored in this flip-flop whenever the service of the central processing unit is required.

Figure 10:
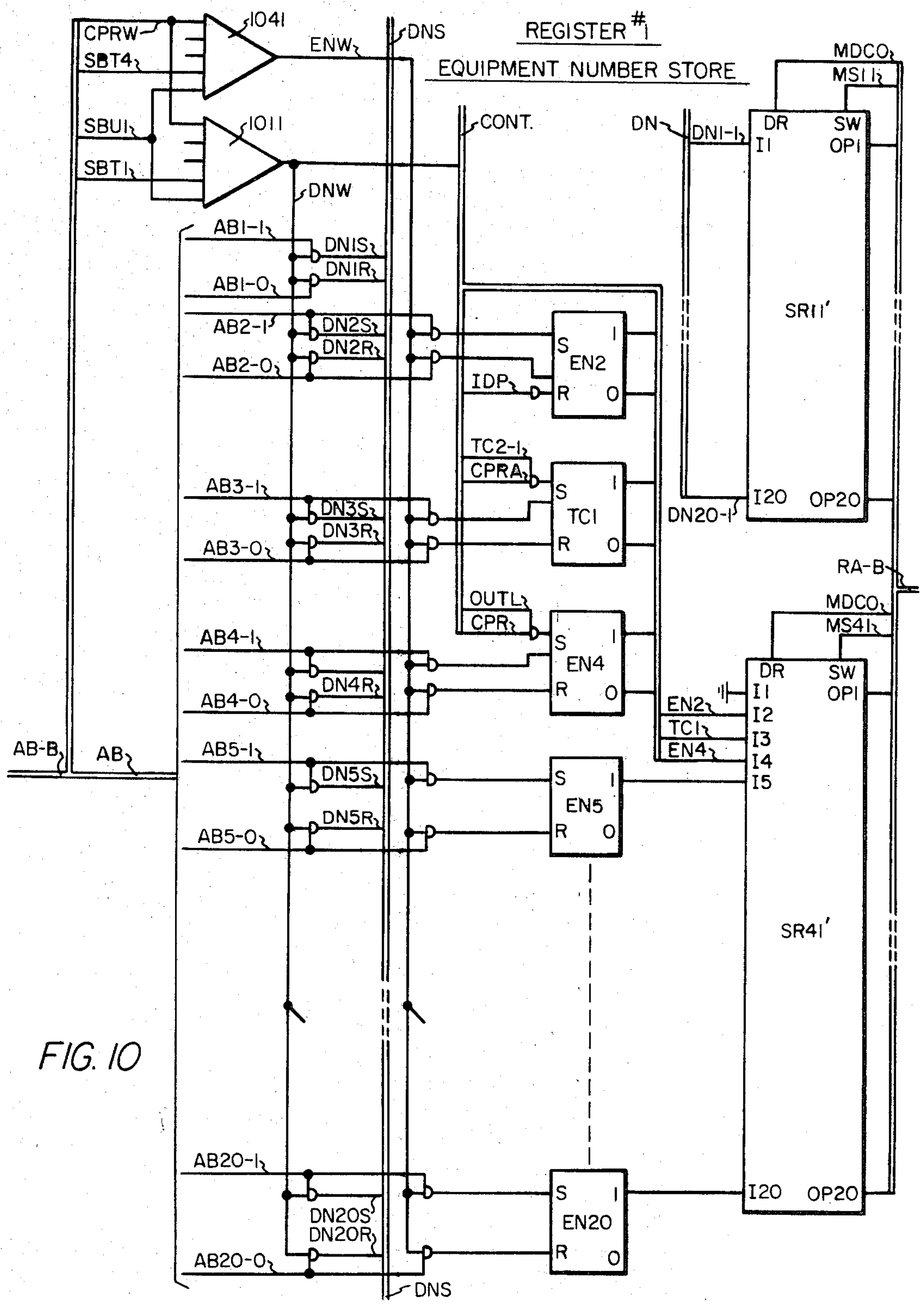

The central processing unit stores information in the flip-flops using the coincidence gates in FIG. 10 to the set of conductors DNS, and reads out the information using the storage read-out circuit SR11' (FIG. 10). The outputs are taken to the storage read-out circuits via contacts of the relay BO. When this relay is operated (the normal state) the flip-flop inputs are connected directly to the storage readout inputs. When the relay drops out, the storage read-out inputs are grounded, making the register appear "busied-out" to the central processing unit. The flip-flop outputs are left floating under this condition. The input coincidence gate circuits shown to the left of the flip-flops DNI–4 in FIG. 9 permit the instruction to be changed by the register circuitry.

The instructions are as follows:

| Instructions | DN1–4 States |
|---|---|
| Release or busied-out | 0000 |
| Timed-out | 1000 |
| Collect one digit | X001 |
| Collect two digits | X010 |
| Collect three digits | X011 |
| Collect four digits | X100 |
| Supply dial tone, collect one digit | X101 |
| Supply 120 IPM busy tone | 0110 |
| Abandoned call | 1111 |
| Idle | 0111 |

An "X" as the state of a flip-flop indicates that it may be either "0" or "1." The instruction decoder is made up of NOR gates, shown in FIG. 9 as AND and OR gates providing equivalent logic. The outputs of the gates supply inputs to the relay drivers 923, 924, and 925 which supply signals via the leads DT, HOL and BT respectively via the set of conductors DIN to the line control circuits in FIG. 12. The signal on lead HOL is "1" for all instructions except "Release or busied-out" (0000) and "Idle" (0111). The presence of the 0000 instruction causes the output of gate 916 to be "1." The presence of the 0111 instruction causes the output of gate 918 to be "1." Either of these conditions produces a "0" at the output or NOR gate 919. This releases the relay driver 924 and via lead HOL drops out relays B and BB in the register line control unit, thus opening the C-lead ground and transmission path conductors. With any other instructions, the C-lead ground and transmission path are closed.

The output of gate 921 assumes a "1" state if, and only if, a "supply dial tone, no call for service" state (0101) exists in the flip-flops, and the sequency flip-flop SC3 is in the reset state. This arrangement interrupts dial tone as soon as a tone or pulse is received, thus eliminating dial-tone "splashes" when the first digit is dialed or keyed. The "1" from gate 921 operates relay driver 923, which via lead DT operates the dial tone relay DT in the line control unit.

Gate 922 decodes the "supply 120 IPM busy tone" (0110) instruction. When this instruction is present, the output of gate 922 operates relay driver 925, which via the lead BT operates the busy tone relay BT in the dropped, control unit. sequence Gate 917 takes part in the release sequence, the output of gate 916 being a "1" when a "release" (0000) instruction is present. When the line loop has opened and the relay A has droped, the output of gate 917 goes to "0."0 When the B relay has dropped out (relay BO is normally operated), a "1" appears at the output of inverter 920. When all these conditions are satisfied, the output of gate 917 becomes "1" enabling coincidence gates to set flip-flops DN2, DN3 and DN4. The next clock pulse on lead CPR then changes the instruction to "idle" (0111). This sequency insures that the register does not appear idle until the C-lead ground has been dropped and the relay A has released.

Figure 11:
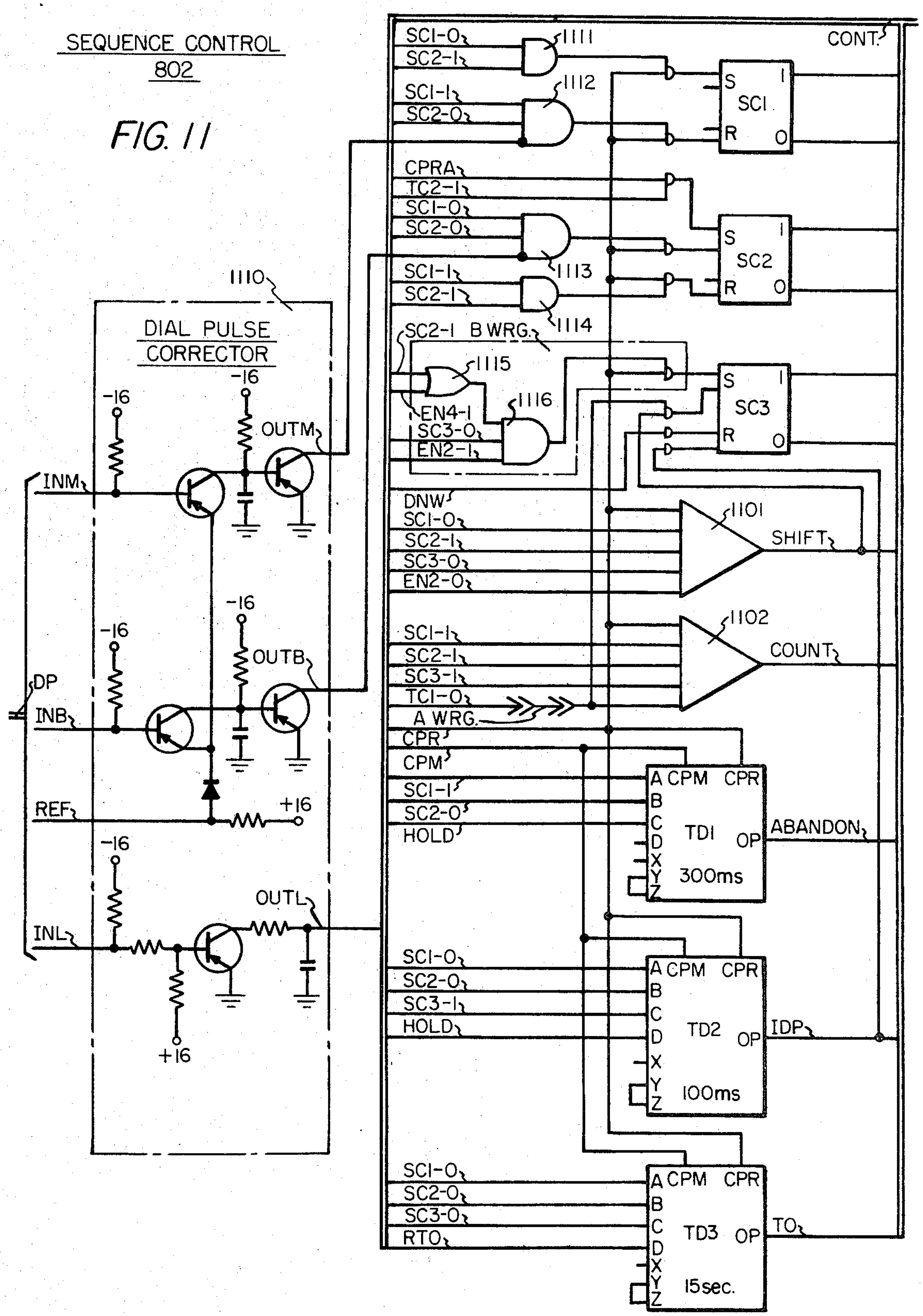
FIG. 11 is a functional block and schematic diagram of the sequence control circuits of a dialing register.

One of the coincidence gates 932 sets flip-flop DN1, creating a call-for-service condition whenever an interdigital pause pulse appears on lead IDP from the timer TD2 in FIG. 11.

When an abandoned call occurs, the pulse on lead ABANDON from the timer TD1 produces an abandoned call (1111) instruction in the instruction store via coincidence gates setting all of the flip-flops DN1–4.

If a new digit is started while a call-for-service condition exists (flip-flop DN1 in the set state), the pulse on lead SHIFT places a "release" (0000) instruction in the flip-flops via coincidence gates enabled by the DC input from lead DN1–1. This situation occurs if for some reason the central processing unit does not service the register in time. The normal release sequence follows. This feature is included because it is better to have the subscriber re-try than to misdirect the call.

There are five coincidence gates having AC input from the lead TO, the gate 931 having a DC enable input from lead DN1–0 to the set input of flip-flop DN1, gate 934 having a DC enable input from the lead DN1–1 to reset flip-flop DN1, and the other three connected to supply reset signals to the flip-flops DN2–4 have no DC input connections so that they are always enabled. Normally flip-flop DN1 is in the reset state when the pulse on lead TO is produced by the tim-out timer TD3 in FIG. 11. Thus the coincidence gate 931 is enabled, so that the pulse on lead TO produces the "timed-out" (1000) instruction in the flip-flops. Certain malfunctions can prevent the central processing unit from answering a call for service. In such a case, the subscriber cannot release the register by dialing or hanging up. If, however, he allows the register to time-out, the timer TD3 recycles in approximately 10 seconds and produces another pulse on lead TO. Since flip-flop DN1 is now in the "1" state, the reset coincidence gates 934 and the other three are enabled so that the second pulse on lead TO places a "release" (0000) instruction in the flip-flop and the normal release sequence follows.

Figure 12:
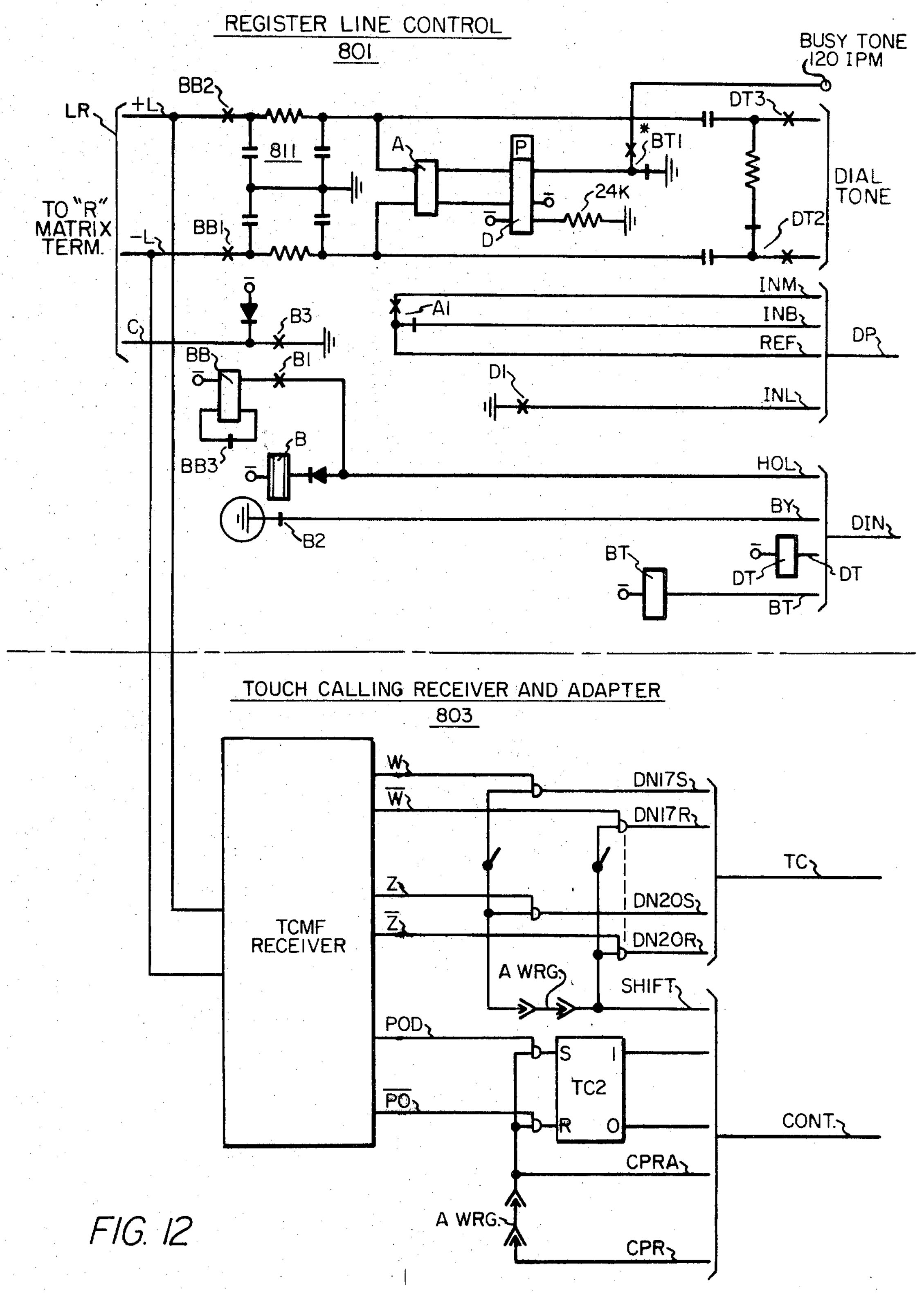
FIG. 12 is a diagram of the line control unit and the touch calling receiver and adapter of a dialing register.

The touch calling receiver and adapter shown in FIG. 12 is optional equipment. The wiring shown on the drawings between arrows designated "A wrg" is used to couple this circuitry into the register. Coincidence gates to leads DN17S–DN20S which are part of the adapter are used to transfer the output of the TCMF receiver into the dial pulse counter flip-flops via the set of conductors TC when a pulse appears on lead SHIFT. These coincidence gates in conjunction with the coincidence gates to leads DN17R–DN20R are used to perform a double-rail transfer. When no tone is present, as in the reception of dial pulses, a "0" digit appears at the output of the decoder, so operation with dial pulse input is as described above.

When a tone pair is accepted by the receiver, the signal on lead $\overline{PO}$ goes to "0" to prevent a "rare" condition at a later stage. The signal on lead POD, after a delay of a few milliseconds to allow the detectors in the receiver to lock-up and the decoder to operate, goes to "1." The next pulse on lead CPR sets flip-flop TC2, preventing the sequence control flip-flop SC1 from resetting. At the same time, the signal on lead TC2–1 enables coincidence gates in FIGS. 10 and 11 so that the next pulse on lead CPR via lead CPRA sets flip-flop TC1 and SC2. This places "0" on lead TC1–0 which via the "A wrg" extends to a coincidence gate for resetting flip-flop SC3 and to the last input of the gated pulse amplifier 1102, preventing the flip-flop SC3 from setting on the pulse SHIFT, and preventing the gated pulse amplifier 1102 from producing a pulse on lead COUNT. The sequence control flip-flops now act as if a dial pulse had been started and go through the sequence as described above via the sequence control circuits, with the exception that flip-flop SC3, which serves no purpose in tone reception, remains at the reset condition. The sequence stops with flip-flop SC1 set and flip-flop SC2 reset, because of the connection to the DC reset lead of a coincidence gate for flip-flop SC1 from gate 1112.

Under normal conditions (not call-for-service present) the output of gate 915 is at "0." When flip-flop TC1 is set, the signal on lead TC1–1 goes to "1," enabling coincidence gate 933 to set flip-flop DN1 when there is an AC pulse on lead SHIFT. The appearance of pulse on lead SHIFT thus sets flip-flop DN1, creating a call-for-service. This call-for-service may be answered by the central processing unit at any time, regardless of the length of time the tones remain on the line. If a digit is started with a call-for-service request present, the signal from gate 915 goes to "0," and the release is started as described above.

After 40 milliseconds, the signal on lead POD in FIG. 12 goes to "0." The signal on lead $\overline{PO}$ then goes to "1" allowing flip-flop TC2 to reset on the next occurrence of pulse on lead CPR. This allows the next pulse on lead CPR to reset flip-flop SC1, preparing the sequence control for the next digit.

The equipment number store for dialing register No. 1, shown in FIG. 10, comprises flip-flops EN2–20. The flip-flop in the place of EN3 is designated TC1 because of its function for touch calling service. The store bus AB–B has the address conductors connected to the gated pulse amplifiers 1011 and 1041 and the data conductors AB1–1 through AB20–0 connected for double rail input to the input coincidence gates for both the directory number and equipment number stores. When the gated pulse amplifier 1011 is addressed by the decoded signals from store SB, namely SBT1 and SBU1, then when a pulse appears on lead CPRW it is gated to the lead DNW to enable the input coincidence gates for the directory number store, the outputs being coupled to the set and reset inputs of flip-flops DN1–20 via the set of conductors DNS which comprises the set and reset conductors DN1S, DN1R for flip-flop DN1 through the set and reset conductors DN20S and DN20R for flip-flop DN20. Similarly when the gated pulse amplifier 1041 is addressed by the signals on leads SBT4 and SBU1 and a pulse appears on lead CPRW it is gated to lead ENW to enable the input coincidence gates for the equipment numbers store. The storage readout circuits SR11′ and SR41′ are used to transfer information from the directory number and the equipment number stores respectively to a load bus when they are addressed by the appropriate memory driver and then memory switch signals.

The sequence control circuits 802 of the dialing register are shown in FIG. 11. A dial pulse corrector 1110 comprising transistor circuits interfaces with the register line control via conductors DP for pulsing and side-of-line detection. There are three sequence control flip-flops SC1, SC2, and SC3. Clock pulses for controlling particular operations of these flip-flops and those in FIGS. 9 and 10 are supplied by gated pulse amplifiers 1101 and 1102; and also by time delay circuits TD1, TD2 and TD3. Direct current input signals for the flip-flops are supplied from gates 1111–1116. Schematic diagrams of the functional blocks are shown in said Duthie-Thomas System patent, and in said Homonick Fault Buffer application.

The time delay circuits each include a diode AND gate at the inputs A, B, C and D arranged so that when all four of these leads are at the logic level "1" the timer is actuated, and a "0" level (ground potential) at any one of these inputs resets the circuit and maintains it at the initial condition. The time delay produced by the circuit is determined by an internal resistor connected by shunting the terminals Y and Z, with a time delay as indicated in the functional block, or by an external resistor connected between the terminals X and Z. The circuit is snychronized by clock pulses on lead CPM. When the circuit has been actuated for the full interval of the time delay, clock pulses on lead CPR are gated through the block to the output lead OP.

The register line control circuit 801 shown in FIG. 12 comprises a pulsing relay A, a polar relay D for side-of-line detection, a slow-to-release hold relay B with a slave relay BB, a dial tone relay DT, and a busy tone relay BT. The transmission conductors +L and –L frOm the R matrix terminal are connected through make contacts of relay BB and a network comprising two 10-ohm series resistors and four 0.1-microfarad shunt capacitors through windings of the relay A and relay D to the –50 volt battery connection for the minus side, and ground via contacts of relay BT for the plus side. Relay D has polarizing windings connected from –50 volt terminal through the winding and a 24,000 ohm resistor to ground. The +L and the –L conductors are also connected through 2.15-microfarad capacitors and make contacts of the relay DT to a dial tone source. When the dial tone relay DT is not operated a 910-ohm resistor is connected between the transmission conductors via break contacts of relay DT.

The sequence control circuits and register line control circuits contain the logic required to identify dial pulses, control counting and storage of dialed digits, detect side-of-line information, and identify interdigital pauses, abandoned calls, and time outs.

When the dialing register is connected via the switching network to a calling termination, relay A operates, completing a circuit via its make contacts between leads REF and INM. This produces a "0" logic level on lead OUTM in FIG. 11 (ground potential via the emitter-collector path of a transistor biased to saturation conduction). The break contacts of relay A open the circuit between leads REF and INB, causing a "1" logic level to appear on lead OUTB (open circuit potential at the collector electrode of a transistor biased to cut off).

At this time all three of the flip-flops are in the reset condition so that the signal conditions on leads SC1–1, SC2–1 and SC3–1 are all at the "0" logic level; and the leads SC1–0, SC2–0 and SC3–0 from the outputs of the flip-flops are at the "1" logic level. The signal on lead HOLD from the instruction decoder (FIG. 9) is at "1." The 15-second timer TD3 is enabled under these conditions. If no digits are received for 15 seconds, the timer will produce an output pulse which changes the contents of the instruction register (FIG. 9) to "timed out."

When the first pulse of a dialed digit appears, the relay A restores so that the signal on lead OUTM becomes "1", which inhibits gate 1112 keeping its output at "0." After an 11 millisecond time delay introduced by the dial pulse corrector 1110, the signal on lead OUTB becomes "0." This removes an inhibit signal from gate 113 so that its output becomes "1." The next pulse on lead CPR then sets flip-flop SC–2. The states of the sequence control flip-flops are now 010.

The gated pulse amplifier 1101 now has all of its DC inputs at "1" so that it is enabled to gate the next pulse from lead CPR to lead SHIFT. This shift pulse resets the pulse counter by shifting the digit "0" into it via the reset coincidence gates shown in FIG. 12 to the four leads DN17R–DN20R. Note that these coincidence gates are not a part of the touch calling adapter but are only shown in FIG. 12 for convenience. The pulse on lead SHIFT also shifts all digits in the shift register of FIG. 9 to the set of four flip-flops having a lower number. (Note that for the numbers stored in the directory number store, DN5–8 comprises the most significant digit with DN5 as the most significant bit, and the digit in flip-flops DN17-20 is the least significant digit with DN20 as the least significant bit. Therefore the shift from flip-flops DN17–20 into flip-flops DN13-16 would be considered a shift to the left insofar as the central processor is concerned although it is shown to the right in FIG. 9). Thus the pulse on lead SHIFT causes the digit in the dial pulse counters DN17–20 to be shifted into flip-flops D 13–16, the digit in flip-flops DN13–16 to be shifted into DN9–12, and a digit in DN9-12 to be shifted in DN5–8. The output in each case refers to the state of the flip-flops before the occurrence of the clock pulse. The pulse on lead SHIFT also sets the flip-flop SC3. The output of gate 1111 is now at "1" so that flip-flop SC1 is set. The states of the sequence control flip-flops are now 111.

Under these conditions the DC inputs of gates pulse amplifier 1102 are all at "1" (the input on lead TC1–0 if the A wiring is connected is at "1" for dial pulse operation). The output at gate 1114 is "1". Therefore the next pulse on lead CPR is gated via gated pulse amplifier 1102 to lead COUNT, and also resets flip-flop SC2. The pulse on lead COUNT advances the dial pulse counter in FIG. 9 by one. The states of the sequence control flip-flops are now 101.

The sequence control condition is now stable, that is, the flip-flops will not change state as long as the line loop at conductors +L and −L remains open. The 300-millisecond timer TD1 is started. If the loop remains open for 300 milliseconds the timer TD1 produces an output pulse on lead ABANDON, which changes the state of the instruction store in FIG. 9. However, under normal conditions, the loop will close before this occurs.

When the loop closes, relay A re-operates, causing the signal on lead OUTB to go to "1." After 110 seconds the signal on lead OUTM goes to "0," causing the output of gate 1112 to go to "1." The next pulse on lead CPR resets flip-flop SC1. The states of the flip-flops are now 001.

Subsequent dial pulses will cause the same sequence of events to occur, except that flip-flop SC3 is now in the "1" state to begin with. This prevents the gated pulse amplifier 1101 from becoming enabled, and thus prevents undesired shifting of digits.

At the end of each pulse, the states of the flip-flops are such that timer TD2 is enabled. If this condition persists for 100 milliseconds, timer TD2 produces an output pulse on lead IDP which resets flip-flop SC3 and generates a call-for-service in the instruction store of FIG. 9.

A ground on lead +L when the loop is closed causes relay D to operate. This is used for party two identification if the calling termination is a party line circuit, coin indication if the termination is a paystation line, or an indication of one pulse absorbed for an incoming dial pulse trunk. Operation of relay D via its make contact places ground potential on lead INL, and after a delay of 78–150 milliseconds a "1" appears on lead OUTL. This sets flip-flop EN4 in FIG. 10 when the next clock pulse appears on lead CPR.

The initial pulse response for an incoming dial pulse trunk makes use of the apparatus and wiring designated B WRG in the sequence control circuits of FIG. 11. This B WRG equipment and flip-flop EN2 are added to each register to provide this function.

The central processing unit places a "1" in flip-flop EN2 and a digit "1" in the pulse counter by setting flip-flop DN20 when the register is first seized for a call.

Gates 1115, 1116 and an input coincidence gate for flip-flop SC3 are arranged so that when flip-flop EN4 is set in response to the signal on lead OUTL upon operation of the relay D in FIG. 12, flip-flop SC3 becomes set on the next occurrence of a pulse on lead CPR. Note that the states of the flip-flops SC1–3 are then 001, which is the same as though the register had received the first pulse of a dialed digit and had produced the pulses on leads SHIFT and COUNT. The inter-digital pause timer TD2 is enabled under these circumstance as it normally would be. Counting of any subsequent pulses (which are received from the incoming trunk circuit unaltered) takes place normally. When the digit is completed, either after the first pulse (first digit equal 1) or a pulse train, the timer TD2 produces a pulse on lead IDP in the normal manner.

Operation on subsequent digits takes place in the normal manner.

The input connection on lead EN2–0 to the gated pulse amplifier 1101 is normally redundant, but prevents accidental shifting if the register is seized just before the second dial pulse. If this connection were not used, the pulse on lead SHIFT would occur because of the delay imposed on lead OUTL by the anti-flick circuitry in the dial pulse corrector 1110. The connection on lead SC2–1 to gate 1115 allows the flip-flop SC3 to be set under these conditions, since the gated pulse amplifier 1101, which would normally perform this function, is disabled.

In FIG. 11, gate 1115 is shown as an OR gate and gate 1116 is shown as an AND gate; whereas in the actual embodiment these are NOR gates with the inputs of gate 1116 the inverse of those shown.

Incoming Dial Pulse Trunk Circuit, and Line Circuit

Figure 13:
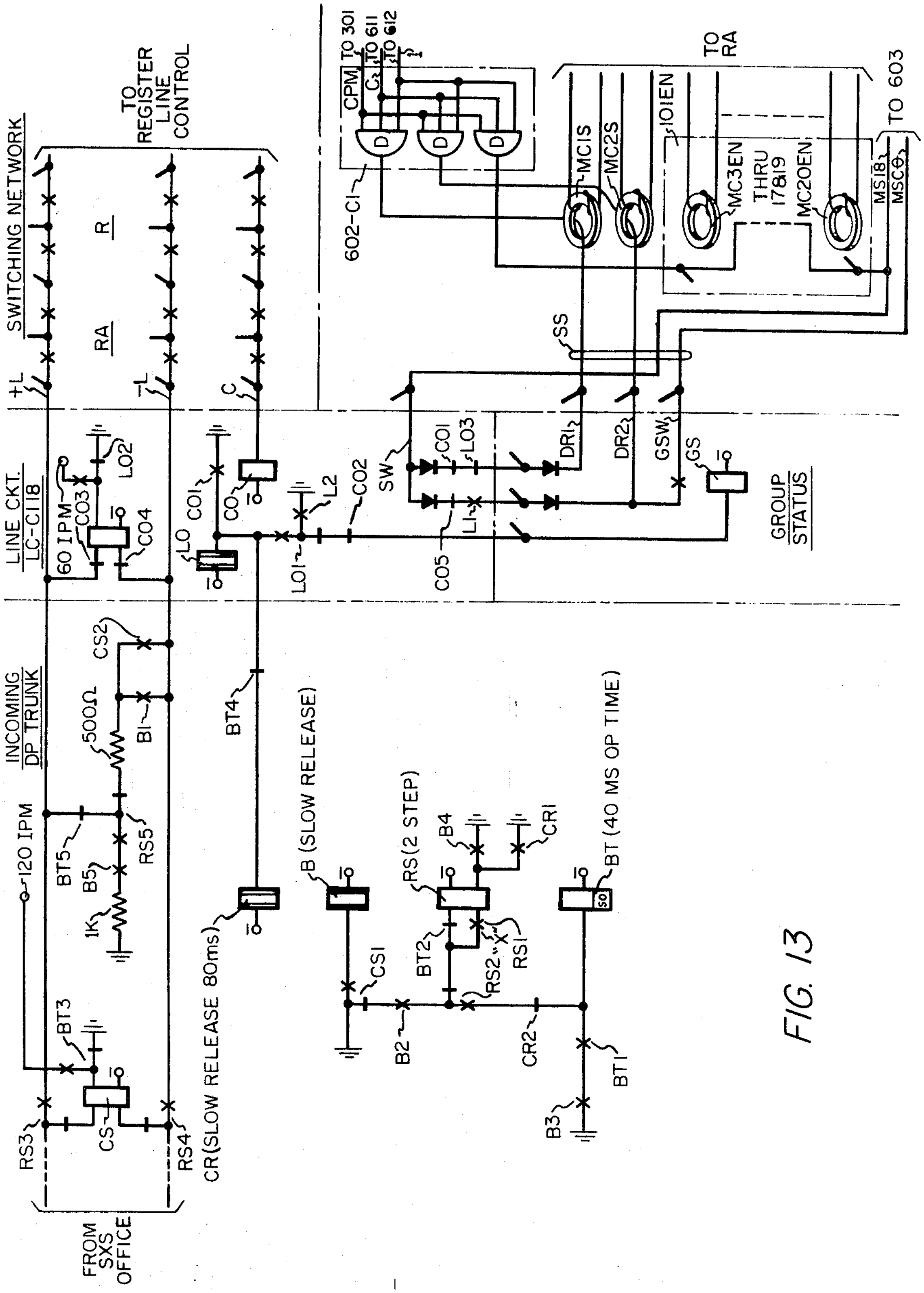
FIG. 13 is a diagram of an incoming dial pulse trunk with its associated line circuit and a portion of the switching network, and also a portion of the ring core memory.

FIG. 13 is a diagram of an incoming dial pulse trunk with its associated line circuit and a portion of the switching network, and also a portion of the ring core memory. The trunk circuit comprises a call seizure relay CS, a slow release relay B for hold during seizure and the first dial pulse, a busy tone relay BT which has a 40-millisecond operate time, a relay CR having a low release time of 80 milliseconds which operate via the cutoff relay contacts of the line circuit, and a 2-step relay RS for detection of a dial pulse.

All of the line and trunk terminations for the switching network have identical line circuits such as the one shown connected to the incoming dial pulse trunk, having a line relay L, a cutoff relay CO, a slow release lockout relay LO, and a status circuit via diodes and contacts of these relays. There is also a group status circuit connected to one hundred line circuits as indicated by the multiple symbols, these line circuits having the same thousandths and hundreds digits for the equipment number identity.

In operation, the trunk circuit is seized upon closure of the loop from the step-by-step office, which operates relay CS via the brake springs of the contacts RS3 and RS4 of relay RS. Operation of make contacts CS2 of relay RS closes the loop through a 500-ohm resistor, break springs of contacts RS5, and break contacts BT5; to thereby operate the line relay L in the line circuit. This causes the call-for-service condition to be presented to the central processing unit via the status circuit. The make springs of the contacts CS1 complete a path to operate relay B. Relay CS in the trunk circuit requires ten milliseconds to operate, and in turn the line relay L requires ten milliseconds to operate. From the instant the line relay operates, at least 92 milliseconds are required to connect the register and make it ready to receive pulses. During this time the central processing unit identifies the call-for-service condition and selects a path through the network; the marker then pulls a path and the register is seized and operates it pulsing relay A. In the meantime it is possible that the first pulse of a digit may be received via the line from the step-by-step outlets in approximately 50 milliseconds. When the switching network connection is established, ground from the register line control circuit via the C lead through the switching network operates the cutoff relay CO in the line circuit. Contacts of the cutoff relay disconnect the line relay, change the status condition to "busy" and extend ground to operate the lockout relay LO, and in the trunk circuit via contact BR4 operates relay CR. This may occur before or during reception of the first pulse received.

At the beginning of the first pulse, (opening of the line loop from the step-by-step office) relay CS releases. Relay B remains operated because of its slow release characteristic. A path is completed from ground via the break springs of contacts CS1 of relay CS, make contacts B2 of relay B, break springs of contacts RS2 of relay RS, and break contacts BT2 of relay BT, via the upper winding of RS to the negative 50-volt battery potential. This relay is a two step relay which, with only the upper winding energized, operates only its preliminary make contacts RS1 (indicated by "x"). The lower winding is not energized under this condition because it is effectively shunted by ground at both sides. At the end of the pulse relay CS re-operates, which at contacts CS1 removes the shunting ground to permit the lower winding of relay RS to be energized in series with the upper winding, via contacts BT2, RS1, and B4. Relay RS which is now fully operated, at its contacts RS2 opens the initial operate path via the break contacts and at its make contacts prepares a path for the busy tone relay BT, at contacts RS3 and RS4 opens the connection to relay CS and switches through the transmission conductors, and at contacts RS5 opens the initial loop to the line circuit and closes the path for the special signal indicating reception of the first pulse. This signal comprises ground potential via a 1,000-ohm resistor, contacts B5, make contacts RS5, and break contacts BT5 to the +L side of the line.

With relay CS disconnected and therefore released, its contacts CS1 via break springs complete a path from ground to the winding of relay BT to initiate a 40-millisecond timing interval for completion of the matrix connection.

If relay CR has already operated or operates within the 40-millisecond interval, its contacts CR1 supply an alternate holding ground for relay RS, and at its break contacts CR2 open the path to the winding of relay BT. Relay B releases after 200 milliseconds, and at its contacts B5 opens the connection for supplying ground to the plus side of the line to remove the special signal.

If relay CR does not operate within the 40-millisecond interval, relay BT operates via ground through contacts CS1, B2, RS2, and CR2; and locks via a path from ground through contacts B3 and BT1. Contacts BT2 of relay BT open the path for relay RS to release it, contacts BT3 which are make-before-break connect 120 IPM busy tone (and also an alternate ground potential from the source thereof) which is extended via the winding of relay CS and contacts of relay RS to the loop to the step-by-step office, and contacts BT4 open the path for operation of relay CR to prevent it from operating later. The 120 IPM busy tone is a reorder signal to the calling subscriber to make a new attempt of the call.

Note that in the trunk circuit all of the relays except relay RS would be required even if a bypass matrix or other arrangement were used to connect the trunk circuit to a register upon seizure. This is so because by the nature of common control there will always be some small number of calls which cannot be connected to a register before dialing commences, and some sort of a trap must be provided to trap such premature dialing. Thus the only extra equipment required in the trunk circuit to provide the feature of the invention is relay RS and the associated circuit for applying the ground potential to the +L transmission conductor.

A portion of the ring core memory 101 and drivers 602 relating to equipment number addresses is shown in FIG. 13. This portion of the memory comprises two status cores MC1S and MC2S, and an equipment number section 101EN comprising eighteen cores MC3EN–MC20EN. In general the memory drivers 602 shown in FIGS. 1 and 6 comprise one driver for each combination of a thousands and a hundreds digit; but for equipment number addresses three drivers in parallel are used for each such combination of digits. For example, for the thousands and hundreds digit combination C1 three drivers 602–C1 are shown in FIG. 13. The output of the first of these drivers extends through core MC1S, and the output of the second of these drivers extends through core MC2S, each in multiple via a group status circuit and isolating diodes to all 100 line circuits of the C1 group. The output of the third driver extends to a terminal of the driver terminal array, this terminal being shown at the top of the set of cores 101EN.

The memory switches 603 shown in FIGS. 1 and 6 extend to the switch terminal arrays of all of the memory modules, the output MS18 from the memory switch having the tens and units digits 1 and 8, being shown in FIG. 13 connected to a terminal at the bottom of module 101EN. These memory switch outputs also extend in multiple to all of the line circuits having that tens and units digits in the equipment number. In addition the output MSC$\theta$ of the memory switch having the tens and units digit combination C$\theta$ extends to the group status circuits for the line circuits as shown in FIG. 13.

For each line circuit there is an individual wire in the equipment number memory module 101EN, one of these wires, that for line circuit C118, being shown. The wire is threaded to indicate the type of line circuit equipment and the class of service for that line circuit. The line circuits are divided into five groups indicated by a group code in bits 18, 19 and 20 (cores MC18EN–MC20EN), groups 0 and 1 being for local lines, groups 2 and 3 for trunks, and group 4 being for test lines. Within each group several of the bits may be used to indicate different classes of service. For example in group 0, bit 15 is for Touch Calling lines, and bit 16 indicates a two-party line; in group 1, bit 13 indicates a coin box line and bit 16 indicates off-hook service; in group 2, bit 13 indicates an incoming in-band CLR coin line, bit 16 indicates an incoming multifrequency line, and bit 17 indicates an incoming dial pulse trunk; in group 3, bit 16 indicates an outgoing coin box, and bit 17 indicates a reverting call trunk. Bits 3 and 4 indicate digit control indicating how many digits to expect on an incoming trunk.

Thus incoming dial pulse trunks have the equipment number memory wire threaded through at least cores MC17EN and MC19EN, bit 17 indicating the incoming dial pulse trunk, and bit 19 indicating group 2. Bits 1 and 2 indicate the status of the line circuit.

Switching Block Diagram

Figure 14:
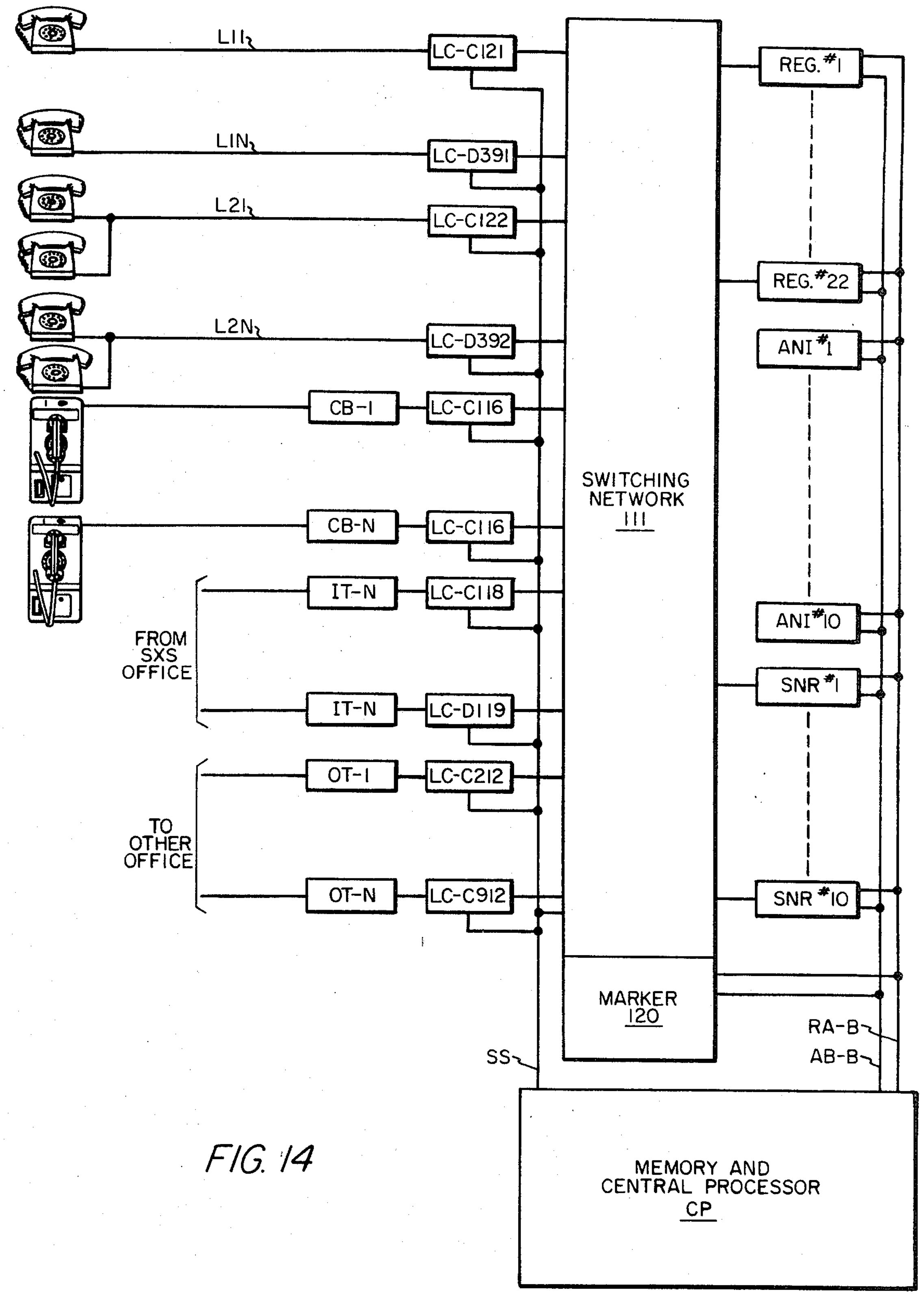
FIG. 14 is a single line block diagram showing some of the terminations connected to the switching network along with the marker and central processor.

FIG. 14 is a single line block diagram showing some of the terminations connected to the switching network along with the marker and central processor; to show a few of the many types of terminations relevant to this disclosure. The memory and central processor apparatus shown in FIG. 1 by blocks CPU, MEMORY, and 700 are shown in FIG. 14 by a single block CP. The switching network and line circuits, block 110 of FIG. 1, is shown in FIG. 14 by the switching network 111 and line circuits designated LC followed by a four-digit equipment number. The registers, senders and ANI block 130 of FIG. 1 is represented in FIG. 14 by the individual units REG No. 1–REG No. 22, ANI No. 1–ANI No. 10, and SNR No. 1–SNR No. 10. The equipment numbers shown for the line circuits are typical numbers that might be assigned showing that for each type of line or termination equipment numbers are assigned in several different hundreds groups. The terminations shown are private local lines L11–L1N, two-party local lines L21–L2N, paystation lines with coinbox adapters CB–1 to CB–1, incoming trunk lines with trunk circuits IT– 1 to IT–N, and outgoing trunk lines with trunk circuits OT–1 to OT–N. On the two-party lines, the station apparatus for one of the parties has an arrangement for applying ground potential to the + side of the line for party identification in a known manner. Likewise the station apparatus for the paystation lines also is arranged to apply ground potential to the + side of the line to indicate coin deposit in a known manner. The arrangement for applying ground potential to the + side of the line in the incoming trunk circuits has been described above. This potential is detected by the polar relay D in the register line control circuits of FIG. 12, and its significance to the central processing unit depends on the class-of-service of the termination.

The switching network 111 may connect any one of the line circuits to any one of the others, or to a register or sender, as disclosed in said Duthie et al system patent, or in the Verbass Switching Network patent application.

Processing of an Incoming Dial Pulse Call

The stored program includes a main executive sequence of routines which checks for a call-for-service status of the various peripheral units including each of the dialing registers, each sender, each ANI unit, the marker, and each group of one hundred lines. Whenever a call-for-service status is found for any one of the units the program enters the routine for servicing it and takes appropriate action. For example when a call-for-service status is found for a line group, the individual lines in that hundred-line group are then scanned to find the call-for-service status, and then a routine is entered to cause a network path to be established from that line circuit termination to a dialing register, and appropriate instructions to be loaded into the instruction store of the selected register. The routine includes a check of the class-of-service of the calling line termination with appropriate instructions and action taken occurring in accordance with the class determination.

Assume now that an incoming dial pulse call from a step-by-step office arrives at the incoming trunk circuit IT–1. In FIG. 13 the relay CS operates, which via the contacts CS2 closes a 500-ohm loop to operate the line relay L of the line circuit. Contacts L2 of the line relay close a path to operate the group status relay GS. Therefore when the program is scanning the line groups, it will at address CIC$\theta$ detect a call-for-service status and enter the program for checking the individual lines. Contacts L2 of the line relay has also closed a path via an isolating diode and conductor DR2 to the memory driver wire via status core MC2S to the C1 driver. Therefore when the program checks at address C118 it finds the call-for-service status. It then enters a routine for servicing the call-for-service, part of which includes checking the class-of-service at the same C118 address, which in this case indicates an incoming dial pulse trunk. The program also causes selection of an idle register which in this case is assumed to be register No. 1, and causes a switching network path to be established between the line circuit LC–C118 via the RA and R stages of the switching network to the selected register. The program also causes information to be stored in the directory number and equipment number stores of the register, which includes the instruction 0101 in the directory number store flip-flops DN1–4 and a "1" in the dial pulse counter (set DN20) at address C011, and a special instruction at the equipment number store address C041 to set the flip-flops EN2, and to store the address C118 in flip-flops EN5–20. After completing all of the required routines, the program returns to the scanning for call-for-service status of other units.

In the register circuits the gate 921 and relay driver 923 cause ground potential to be applied to lead DT to operate the dial tone relay DT in the register line control unit of FIG. 12, and ground also is applied via contacts of relay driver 924 to lead HOL to operate relays B and BB in FIG. 12. Ground is applied via contacts B3 of relay B to the C lead which holds the switching network connection and also operates the relay CO in the line circuit of FIG. 13. Operation of the cut-off relay removes the line relay from the transmission conductors, changes the line status to busy, and via contacts C01 supplies ground potential to the hold conductor to the trunk circuit which extends via break contacts BT4 to relay CR.

In the meantime the first dialed digit may commence from the step-by-step office which causes operations in the dial pulse trunk circuit as described above. The first pulse operates relay RS to supply ground potential via the 1000-ohm resistor to the +L conductor to the register. If the register is selected and the network connection established in time relay CR operates before the second pulse arrives and the call may proceed. However, if for some reason relay CR is not operated within 40 milliseconds of the end of the first dial pulse, relay BT operates, and at contacts BT4 the connection is opened to prevent the subsequent operation of relay CR.

Assuming that the connection is completed through the network, the first dial pulse is detected in the register by the relay D operating in response to the ground on the +L side of the line, and operation proceeds as described above.

At the end of the first dialed digit during the interdigital pause, the register calls for service, and a program routine in response to this call-for-service proceeds to analyze the digit and take action. This action may be the same as for any call because all special conditions have been changed to normal conditions before the call-for-service condition is generated.

Note that while the description above has called for inserting the digit "1" into the dialed digit store at the initial seizure of the register, it could alternatively be provided that the first digit is received and counted without a first pulse, and after the call for service the program could be arranged in response to the class of service analysis of the calling termination to add "1" to this first digit. In some circumstances this might be more expedient if it proved difficult to provide all of the small amount of additional equipment in the register to take care of the special initial conditions.

What is claimed is:

1. In a communication switching system, a plurality of termination circuits of different types, including incoming dial pulse trunk circuits, a plurality of dial pulse registers, a switching network for selectively establishing paths to connect any of said termination circuits to any of said dial pulse registers, common control means having status conductor means connected to said termination circuits, store and load conductor means connected to said dial pulse registers, and control conductor means connected to said switching network;

each of said termination circuits including seizure means operable upon the receipt of a call to apply a call-for-service signal condition to the status conductor means, the common control means including means operative responsive to a call-for-service signal condition on the status conductor means to select a path and to cause, via the control conductor, the switching network to connect the path from the calling termination circuit to a selected dial pulse register, and means to determine the type designation of the calling termination circuit and to supply data including said type designation via the store conductor means to the selected dial pulse register;

each dial pulse trunk circuit further including pulse detecting means to detect the first pulse received for the first digit on a call after operation of its seizure means, and responsive to detecting the pulse to apply a given signal condition to its path to the switching network, and means effective after the establishment of said network path connection for applying any subsequently received pulses via the network path to the selected dial pulse register;

each of said dial pulse registers having pulse repeating means and a special device coupled to its path to the network, the special device being operative responsive to said given signal condition, with its operation signifying one of a plurality of meanings depending on the type of calling termination circuit, means to store the data received via the store conductor means, dial pulse counting means coupled to the pulse repeating means to receive dialed digits, and means responsive to said type designation in the data indicating an incoming dial pulse trunk and said special device being operated to add a count of one to the first digit in said dial pulse counting means.

2. In a communication switching system, the combination as claimed in claim 1, wherein each of said dial pulse registers includes an interdigital timer (TD2) which is started by means responsive to the end of each dial pulse from said pulse repeating means and runs until the start of the next dial pulse or until a given time interval when it produces an interdigital pause signal indicating the end of a dialed digit, and means effective when said type designation indicates an incoming dial pulse trunk and responsive to the operation of said special device to start said interdigital timer, whereby the interdigital pause signal is generated at the end of the first digit whether it comprises only the first dial pulse detected in the dial pulse trunk circuit or includes additional dial pulses.

3. In a communication switching system, the combination as claimed in claim 2, when said common control means includes a stored program central processing unit which supplies said data to the selected dial pulse register, wherein each of said dial pulse registers includes a dial-pulse-trunk-indication device (EN2), and wherein responsive to the type designation indicating an incoming dial pulse trunk the data supplied from the central processing unit to the selected register causes the dial-pulse-trunk-indication device to be set and the digit value "1" to be stored in said dial pulse counting means.

4. In a communication switching system, the combination as claimed in claim 3, wherein each of said dial pulse registers includes digit storage means including said dial pulse counting means for storing a plurality of digits, shift means for shifting complete digits towards adjacent digit stores within the digit storage means and for clearing the dial pulse counting means to "o," means responsive to the occurrence of the first pulse received for each dialed digit for actuating the shift means to thereby clear the dial pulse counter and shift the digits into adjacent positions, and means responsive to said dial-pulse-trunk-indication device (EN2) being set to inhibit said shift means for the first dialed digit.

5. In a communication switching system, the combination as claimed in claim 4, wherein each of said dial pulse registers further includes a special-indication bistable device (EN4)

which is set responsive to operation of said special device to control said operations which are responsive to said special device being operated.

6. In a communication switching system, the combination as claimed in claim 5, wherein each of said dial pulse registers include the plurality of sequence control bistable devices and associated logic with inputs coupled to said pulse repeating means, the interdigital timer and the shift means to control the reception of dial pulses and the operation of the dial pulse counter and shift means, there being a count control means (1102) to supply a count signal for each dial pulse to cause the addition of "1" to the value in said dial pulse counting means; one of the sequence control bistable devices (SC3) being set during the first pulse of each digit to control said shift means and said interdigital timer so that the shift means is actuated only once for each digit, and wherein there is special gate means responsive to said dial-pulse-trunk-indication device and said special indication bistable device being set to set said one sequence state bistable device (SC3) to thereby produce the sequence state condition equivalent to that at the end of a first dial pulse, whereby the shift means is inhibited for the first dialed digit.

7. In a communication switching system, the combination as claimed in claim 6, wherein the count control means is actuated for dial pulses actually received via said pulse repeating means so that during the first dialed digit the value of the count in said pulse counting means is equal to the value "1" initially stored in the dial pulse counting means plus the number of pulses received via the pulse repeating means.

8. In a communication switching system, the combination as claimed in claim 7, wherein said given signal condition is produced by connecting one side of the line in the incoming dial pulse trunk circuit via resistance to a source of reference potential (ground potential), and wherein said special device in each dial pulse register is a polarized relay.

9. In a communication switching system, the combination as claimed in claim 2, wherein said given signal condition is produced by connecting one side of the line in the incoming dial pulse trunk circuit via resistance to a source of reference potential (ground potential), and wherein said special device in each dial pulse register is a polarized relay.

10. In a communication switching system, a plurality of termination circuits of different types, including incoming dial pulse trunk circuits, a plurality of dial pulse registers, each having dial pulse counting means, a switching network for selectively establishing paths to connect any of said termination circuits to any of said dial pulse registers, common control means having status conductor means connected to said termination circuits, store and load conductor means connected to said dial pulse registers, and control conductor means connected to said switching network;

each of said termination circuits including seizure means operable upon the receipt of a call to apply a call-for-service signal condition to the status conductor means, the common control means having means including a stored program processor operative responsive to a call-for-service signal condition on the status conductor means to select a path and to cause, via the control conductor means, the switching network to connect the path from the calling termination circuit to a selected dial pulse register, and having means to determine the type designation of the calling termination circuit;

each dial pulse trunk circuit further including pulse detecting means to count at least the first pulse received for the first digit on a call after operation of its seizure means, and for applying any pulses not counted in the trunk circuit via the network path to the selected dial pulse register, these pulses being registered by the dial pulse counting means thereof;

and means responsive to the determination of the type designation indicating an incoming dial pulse trunk circuit to add together the number of pulses counted in the dial pulse trunk circuit and in the dial pulse counting means of the dialing register to determine the value of the first digit.

* * * * *